US011953815B2

(12) United States Patent
Tsukioka et al.

(10) Patent No.: US 11,953,815 B2
(45) Date of Patent: Apr. 9, 2024

(54) PROJECTOR

(71) Applicant: SEIKO EPSON CORPORATION, Tokyo (JP)

(72) Inventors: Keita Tsukioka, Matsumoto (JP); Yasuteru Miyaoka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 78 days.

(21) Appl. No.: 17/708,056

(22) Filed: Mar. 30, 2022

(65) Prior Publication Data

US 2022/0317552 A1     Oct. 6, 2022

(30) Foreign Application Priority Data

Mar. 30, 2021  (JP) ................................. 2021-056845

(51) Int. Cl.
*G03B 21/16*  (2006.01)
*G03B 21/14*  (2006.01)
*G03B 21/20*  (2006.01)

(52) U.S. Cl.
CPC ........... *G03B 21/16* (2013.01); *G03B 21/145* (2013.01); *G03B 21/2033* (2013.01)

(58) Field of Classification Search
CPC ... G03B 21/16; G03B 21/145; G03B 21/2033
See application file for complete search history.

(56) References Cited

U.S. PATENT DOCUMENTS

| 2004/0263799 | A1* | 12/2004 | Lim .................. G03B 21/18 348/E5.143 |
| 2007/0268666 | A1 | 11/2007 | Yang et al. |
| 2008/0094581 | A1 | 4/2008 | Nakagawa et al. |
| 2009/0207382 | A1 | 8/2009 | Hsiao et al. |
| 2015/0029471 | A1* | 1/2015 | Kanai .................. H04N 9/3144 353/121 |
| 2016/0109788 | A1 | 4/2016 | Yanagihara |

FOREIGN PATENT DOCUMENTS

| JP | 2007-206604 A | 8/2007 |
| JP | 2008-102375 A | 5/2008 |
| JP | 2016-080957 A | 5/2016 |

* cited by examiner

*Primary Examiner* — Jerry L Brooks
(74) *Attorney, Agent, or Firm* — Dority & Manning, P.A.

(57) ABSTRACT

A projector includes a light source device, an image projection device configured to modulate light emitted from the light source device to generate image light and project the image light, a power supply device configured to supply electric power to the light source device and the image projection device, a housing configured to house the light source device, the image projection device, and the power supply device, a first discharge fan configured to set at least one device of the light source derive, the image projection device, and the power supply device as a cooling target and suck gas from the cooling target and discharge the gas, a second discharge fan configured to discharge the gas discharged by the first discharge fan and the gas in the housing to an outside of the housing, and a duct for circulating the gas discharged by the first discharge fan to the second discharge fan.

20 Claims, 12 Drawing Sheets

PROJECTOR

The present application is based on, and claims priority from JP Application Serial Number 2021-056845, filed Mar. 30, 2021, the disclosure of which is hereby incorporated by reference herein in its entirety.

BACKGROUND

1. Technical Field

The present disclosure relates to a projector.

2. Related Art

There has been known a projector including two discharge fans that discharge exhaust of a light source and the like to the outside of a housing (for example, JP-A-2008-102375 (Patent Literature 1)).

The projector described in Patent Literature 1 includes a first discharge fan that discharges exhaust from the light source and a second discharge fan that discharges exhaust from a light source section. The first discharge fan and the second discharge fan are disposed such that a part of the first discharge fan and a part of the second discharge fan overlap. The exhaust from the light source is discharged to the outside of the housing by the first discharge fan and the second discharge fan.

However, in the projector described in Patent Literature 1, since a part of the first discharge fan and a part of the second discharge fan overlap, turbulence of an air current sucked by the second discharge fan located downstream is easily caused by air blown out from the first discharge fan located upstream. Therefore, the second discharge fan less easily sucks the air. Exhaust efficiency by the second discharge fan is deteriorated. Eventually, cooling efficiency of a cooling target is likely to be deteriorated.

SUMMARY

A projector according to a first aspect of the present disclosure includes: a light source device; an image projection device configured to modulate light emitted from the light source device to generate image light and project the image light; a power supply device configured to supply electric power to the light source device and the image projection device; a housing configured to house the light source device, the image projection device, and the power supply device; a first discharge fan configured to set at least one device of the light source derive, the image projection device, and the power supply device as a cooling target and suck gas from the cooling target and discharge the gas; a second discharge fan configured to discharge the gas discharged by the first discharge fan and gas in the housing to an outside of the housing; and a duct for circulating the gas discharged by the first discharge fan to the second discharge fan.

A projector according to a second aspect of the present disclosure includes: a light source device; an image projection device configured to modulate light emitted from the light source device to generate image light and project the image light; a power supply device configured to supply electric power to the light source device and the image projection device; a housing configured to house the light source device, the image projection device, and the power supply device; a first supply fan configured to set at least one device of the light source derive, the image projection device, and the power supply device as a cooling target and supply gas to the cooling target; a second supply fan configured to supply the gas sucked from an outside of the housing to the first supply fan; and a duct for circulating the gas supplied by the second supply fan to the first supply fan. The first supply fan supplies the gas supplied by the second supply fan to the cooling target to cool the cooling target. One fan of the first supply fan and the second supply fan supplies a part of the sucked gas to an inside of the housing.

DESCRIPTION OF EXEMPLARY EMBODIMENTS

First Embodiment

A first embodiment of the present disclosure is explained below with reference to the drawings.

Schematic Configuration of a Projector

Figure 1:
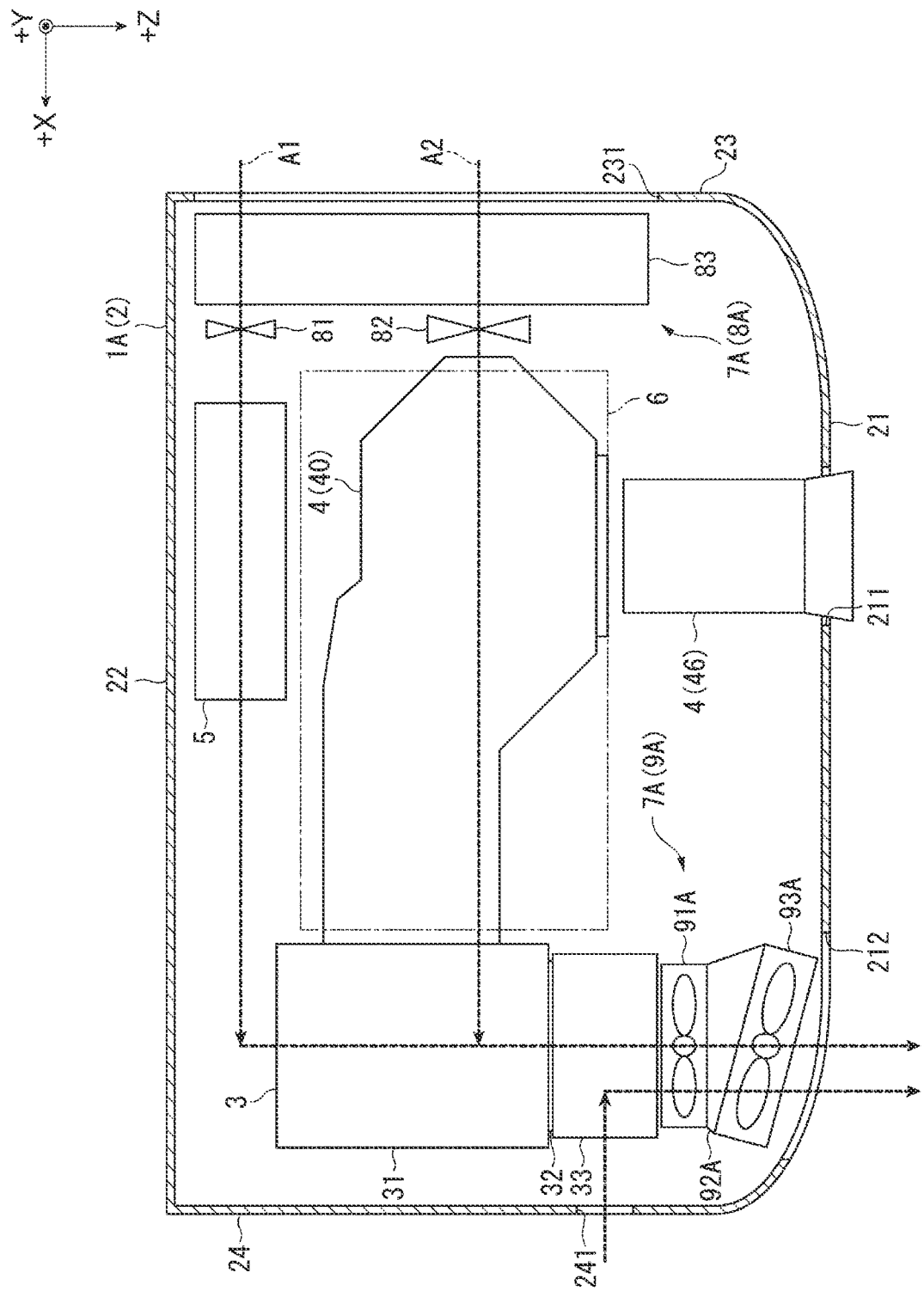
FIG. 1 is a schematic diagram showing the configuration of a projector according to a first embodiment.

FIG. 1 is a schematic diagram showing an internal configuration of a projector 1A according to a first embodiment.

The projector 1A according to the first embodiment of the present disclosure is a projection device that modulates light emitted from a light source to generate image light corresponding to image information and projects the generated image light onto a projection surface such as a screen. The projector 1A includes, as shown in FIG. 1, an exterior housing 2, a light source device 3, an image projection device 4, a power supply device 5, a control device 6, and a cooling device 7A.

Configuration of the Exterior Housing

The exterior housing 2 is equivalent to a housing and configures the exterior of the projector 1A. The exterior housing 2 houses the light source device 3, the image projection device 4, the power supply device 5, the control device 6, and the cooling device 7A. The exterior housing 2 includes a front surface 21, a rear surface 22, a right side surface 23, a left side surface 24, a not-shown top surface, and a not-shown bottom surface and is configured in a substantially rectangular parallelepiped shape.

In the following explanation, three directions orthogonal to one another are represented as a +X direction, a +Y direction, and a +Z direction. The +Z direction is a direction from the rear surface 22 to the front surface 21, the +X direction is a direction from the right side surface 23 to the left side surface 24, and the +Y direction is a direction from the bottom surface to the top surface. Although not shown in the figures, the opposite direction of the +X direction is represented as a −X direction, the opposite direction of the +Y direction is represented as a −Y direction, and the opposite direction of the +Z direction is represented as a −Z direction.

The front surface 21 and the rear surface 22 are surfaces on the opposite sides to each other in the +Z direction.

The front surface 21 is equivalent to a first surface and is a surface in a projecting direction of image light in the exterior housing 2. The front surface 21 includes a first opening section 211 and a second opening section 212.

The first opening section 211 is an opening from which a part of a projection optical device 46 explained below is exposed. Light projected by the projection optical device 46 passes through the first opening section 211 and is projected to the outside of the exterior housing 2. The first opening section 211 is provided further in the −X direction than the center on the front surface 21.

The second opening section 212 is an exhaust port through which gas is discharged from the inside of the exterior housing 2 by the cooling device 7A explained below. The second opening section 212 is provided further in the +X direction than the center on the front surface 21.

The right side surface 23 and the left side surface 24 are surfaces on the opposite sides to each other in the +X direction.

The right side surface 23 is disposed in the −X direction in the exterior housing 2. A supply device 8A explained below is fixed on the inner side of the right side surface 23 on the inside of the exterior housing 2. The right side surface 23 includes an opening section 231.

The opening section 231 is an introducing port for introducing air on the outside of the exterior housing 2 into the inside of the exterior housing 2 as a cooling gas.

The left side surface 24 is disposed in the +X direction in the exterior housing 2. The left side surface 24 includes an opening section 241.

Like the opening section 231, the opening section 241 is an introducing port for introducing the air on the outside of the exterior housing 2 into the inside of the exterior housing 2 as the cooling gas. A not-shown filter for collecting dust in circulating air is provided in the opening section 241.

Configuration of the Light Source Device

The light source device 3 is disposed in a portion on the rear surface 22 side and on the left side surface 24 side in the exterior housing 2.

The light source device 3 emits illumination light for illuminating a modulation region of a light modulation device 443 (see FIG. 2) configuring the image projection device 4. The light source device 3 includes a light source 31, a heat receiving member 32, and a heat radiating member 33.

The light source 31 emits light. As the configuration of the light source 31, a configuration including a solid-state light emitting element such as an LD (Laser Diode) and a wavelength conversion element that converts light in a first wavelength band emitted from the solid-state light emitting element into light in a second wavelength band different from the first wavelength band is illustrated. As another configuration of the light source 31, there is a configuration including a discharge lamp such as an ultra-high pressure mercury lamp.

The heat receiving member 32 transmits heat of the light source 31 to the heat radiating member 33.

The heat radiating member 33 radiates heat transmitted from the light source 31 via the heat receiving member 32. Specifically, the heat radiating member 33 transmits the heat of the light source 31 to the cooling gas introduced into the inside of the exterior housing 2 to thereby radiate the heat of the light source 31 to cool the light source 31.

The gas on the outside of the exterior housing 2 circulates to the heat radiating member 33 as the cooling gas from the opening section 241 provided on the left side surface 24 of the exterior housing 2. The cooling gas, to which the heat of the light source 31 is transmitted, is discharged to the outside of the exterior housing 2 by a discharge device 9A of the cooling device 7A explained below.

Configuration of the Image Projection Device

The image projection device 4 modulates light emitted from the light source device 3, forms an image corresponding to image information input from the control device 6, and projects the formed image. The image projection device 4 is disposed along the rear surface 22 and the right side surface 23 in a portion in the −X direction with respect to the light source device 3. The image projection device 4 includes an image forming device 40 and the projection optical device 46.

Configuration of the Image Forming Device

Figure 2:
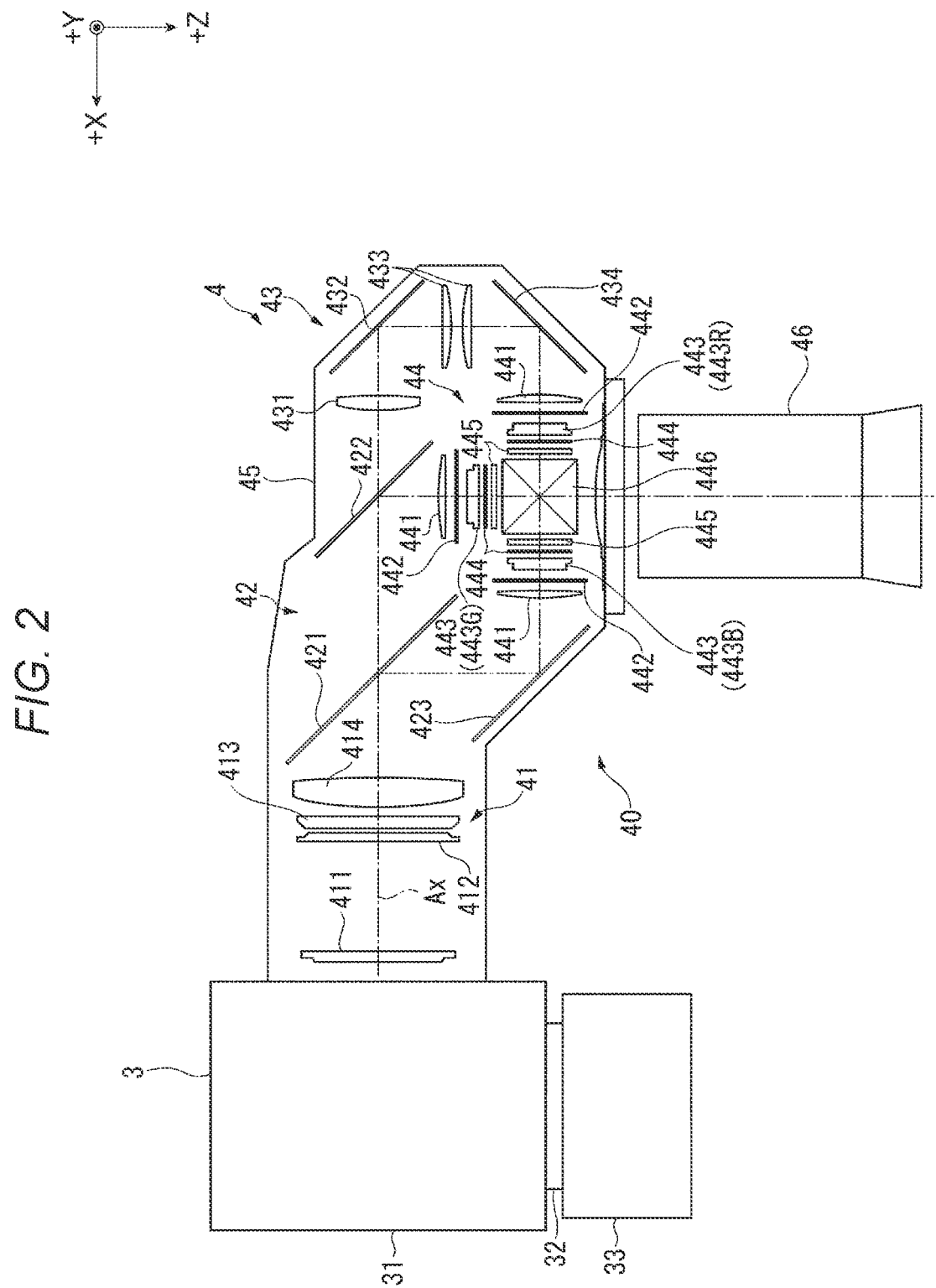
FIG. 2 is a schematic diagram showing the configuration of an image projection device according to the first embodiment.

FIG. 2 is a schematic diagram showing the configuration of the image projection device 4.

The image forming device 40 modulates light emitted from the light source device 3 to form an image. The imaging forming device 40 includes an uniformizing section 41, a color separating section 42, a relay section 43, an image forming section 44, and a housing for optical component 45.

The uniformizing section 41 uniformizes the light emitted from the light source device 3. The uniformized light illuminates the modulation region of the light modulation device 443 explained below through the color separating section 42 and the relay section 43. The uniformizing section 41 includes two lens arrays 411 and 412, a polarization conversion element 413, and a superimposition lens 414.

The color separating section 42 separates light made incident from the uniformizing section 41 into color lights of red, green, and blue.

The color separating section 42 includes two dichroic mirrors 421 and 422 and a reflection mirror 423 that reflects the blue light separated by the dichroic mirror 421.

The relay section 43 is provided in an optical path of the red light longer than optical paths of the other color lights and suppresses a loss of the red light. The relay section 43 includes an incident-side lens 431, a relay lens 433, and reflection mirrors 432 and 434. In this embodiment, the relay section 43 is provided on the optical path of the red light. However, not only this, but the color light having the optical path longer than the optical paths of the other color lights may be the blue light and the relay section 43 may be provided on the optical path of the blue light.

The image forming section 44 modulates the color lights of red, green, and blue made incident thereon, combines the modulated color lights, and forms an image. The image forming section 44 includes three field lenses 441, three incident-side polarizing plates 442, three light modulation devices 443, three viewing angle compensation plates 444, and three emission-side polarizing plates 445 provided to correspond to the incident color lights and one color combining section 446.

The light modulation device 443 modulates, according to image information, light emitted from the light source device 3. The three light modulation devices 443 include a light modulation device 443R that modulates the red light, a light modulation device 443G that modulates the green light, and a light modulation device 443B that modulates the blue light. The light modulation devices 443 are configured by transmission-type liquid crystal panels. Liquid crystal light valves are configured by the incident-side polarizing plates 442, the light modulation devices 443, and the emission-side polarizing plates 445.

The color combining section 446 combines the three color lights modulated by the light modulation devices 443B, 443G, and 443R to form an image and emits the formed image to the projection optical device 46. In this embodiment, the color combining section 446 is configured by a cross dichroic prism. However, not only this, but the color combining section 446 can be configured by, for example, a plurality of dichroic mirrors as well.

The housing for optical components 45 houses the sections 41 to 44 explained above on the inside. An illumination optical axis Ax, which is an optical axis in design, is set in the image projection device 4. The housing for optical components 45 holds the sections 41 to 44 in predetermined positions on the illumination optical axis Ax. The light source device 3 and the projection optical device 46 are disposed in predetermined positions on the illumination optical axis Ax.

Configuration of the Projection Optical Device

The projection optical device 46 is a projection lens that enlarges and projects an image made incident from the image forming section 44 onto the projection surface. That is, the projection optical device 46 projects light modulated by the light modulation device 443. As the projection optical device 46, a group lens including a plurality of lenses and a tubular lens barrel, on the inside of which the plurality of lenses are housed, can be illustrated.

Configurations of the Power Supply Device and the Control Device

As shown in FIG. 1, the power supply device 5 supplies driving power to optical components configuring the projector 1A. That is, the power supply device 5 supplies electric power to the light source device 3 and the image projection device 4. The power supply device 5 transforms electric power supplied from the outside and supplies the transformed electric power to the electronic components. In this embodiment, the power supply device 5 is configured as a circuit board on which circuit elements such as a transformer are provided. The power supply device 5 is located in the −Z direction with respect to the image projection device 4. That is, the power supply device 5 is disposed between the image projection device 4 and the rear surface 22.

The control device 6 is a circuit board on which an arithmetic processing circuit such as a CPU (Central Processing Unit) is provided. The control device 6 controls the operation of the projector 1A. The control device 6 is disposed in the +Y direction with respect to the image projection device 4.

Configuration of the Cooling Device

The cooling device 7A cools a cooling target housed on the inside of the exterior housing 2. The cooling device 7A includes the supply device 8A and the discharge device 9A.

Configuration of the Supply Device

The supply device 8A is provided to correspond to the opening section 231 in the exterior housing 2. The supply device 8A introduces the gas on the outside of the exterior housing 2 into the inside of the exterior housing 2 as the cooling gas via the opening section 231 and supplies the introduced cooling gas to a cooling target. The cooling target of the supply device 8A is at least one device of the light source device 3, the image projection device 4, the power supply device 5, and the control device 6. In this embodiment, the cooling target is the image projection device 4, the power supply device 5, and the control device 6.

The supply device 8A includes a first supply fan 81, a second supply fan 82, and a filter unit 83.

The filter unit 83 is provided to correspond to the opening section 231. The filter unit 83 removes dust included in the gas introduced into the inside of the exterior housing 2 from the outside of the exterior housing 2 via the opening section 231.

The first supply fan 81 and the second supply fan 82 suck the gas on the outside of the exterior housing 2 via the opening section 231 and the filter unit 83 and supply the gas to the inside of the exterior housing 2 as the cooling gas. Therefore, the supply fans 81 and 82 are suction fans as well.

The cooling gas supplied to the inside of the exterior housing 2 by the first supply fan 81 circulates along the power supply device 5 as indicated by a dotted line arrow A1 in FIG. 1 and cools the power supply device 5. The cooling gas having cooled the power supply device 5 circulates toward the left side surface 24 and reaches the light source device 3.

The cooling gas supplied to the inside of the exterior housing 2 by the second supply fan 82 circulates along the image forming device 40 and the control device 6 as indicated by a dotted line arrow A2 in FIG. 1 and cools the image forming device 40 and the control device 6. For example, the cooling gas cools the three light modulation devices 443 and the polarization conversion element 413 (see FIG. 2). The cooling gas having cooled the image forming device 40 and the control device 6 circulates toward the left side surface 24 and reaches the light source device 3.

Configuration of the Discharge Device

The discharge device 9A sucks the cooling gas having circulated in the exterior housing 2 and cooled the cooling target and discharges the cooling gas to the outside of the exterior housing 2. In this embodiment, the discharge device 9A sucks the cooling gas to which the heat of the light source device 3, which is the cooling target, is transmitted and discharges the sucked cooling gas to the outside of the exterior housing 2 to thereby cool the light source device 3. The discharge device 9A includes a first discharge fan 91A, a duct 92A, and a second discharge fan 93A.

Configuration of the First Discharge Fan

Figure 3:
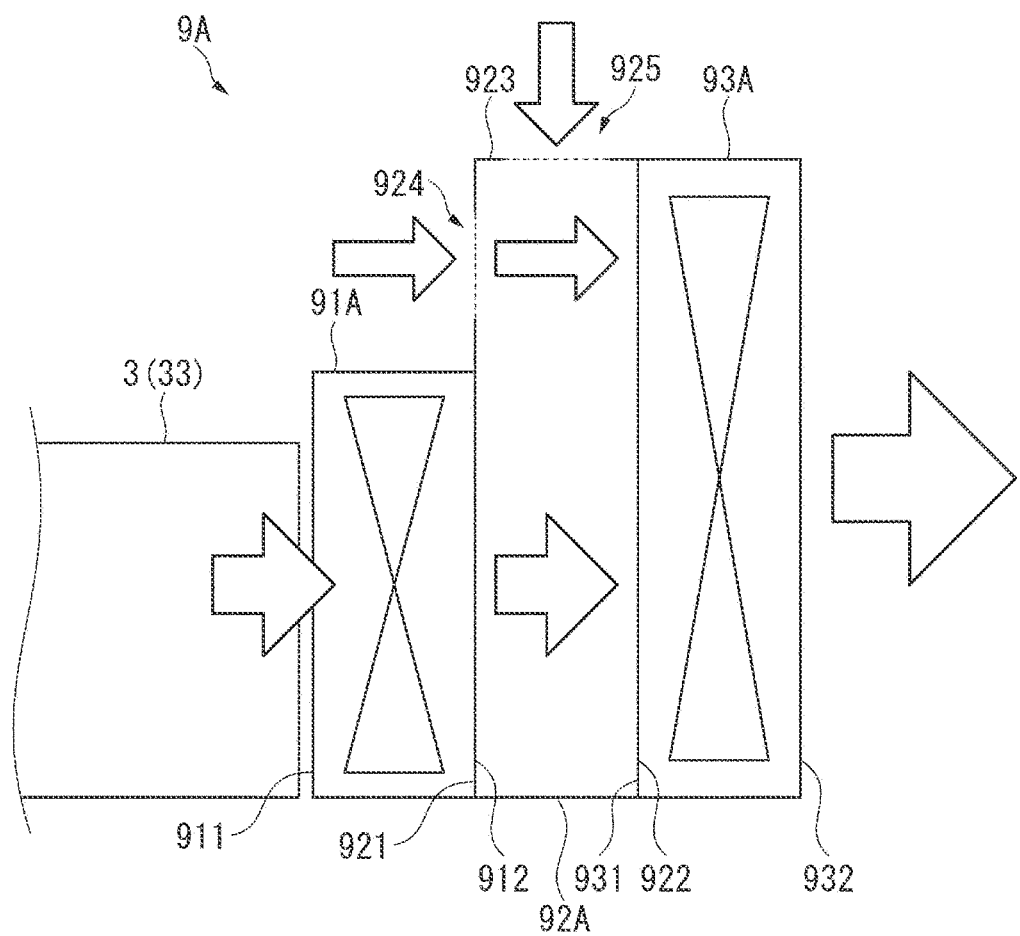
FIG. 3 is a schematic diagram showing the configuration of a discharge device of a cooling device according to the first embodiment.

FIG. 3 is a diagram schematically showing a cross section of the discharge device 9A along a YZ plane.

The first discharge fan 91A is an axial fan that sucks the gas from the light source device 3 and discharges the gas.

Specifically, the first discharge fan 91A sucks the cooling gas to which the heat of the light source 31 is transmitted in the heat radiating member 33 of the light source device 3 and discharges the cooling gas to the duct 92A. The cooling gas discharged to the duct 92A circulates to the second discharge fan 93A. In this embodiment, all of the cooling gas sucked by the first discharge fan 91A and discharged from the first discharge fan 91A circulates to the second discharge fan 93A via the duct 92A.

A surface opposed to the light source device 3 in the first discharge fan 91A is an intake surface 911 that sucks the cooling gas. A surface opposed to the second discharge fan 93A in the first discharge fan 91A is an exhaust surface 912 that discharges the sucked cooling gas. The dimension of the intake surface 911 is substantially the same as the dimension of the light source device 3 when viewed from the first discharge fan 91A. The dimension of the intake surface 911 and the dimension of the exhaust surface 912 are substantially the same.

Configuration of the Duct

The duct 92A connects the first discharge fan 91A and the second discharge fan 93A and circulates all of the cooling gas discharged by the first discharge fan 91A to the second discharge fan 93A.

The duct 92A extends in the +Z direction from the first discharge fan 91A toward the second discharge fan 93A. Specifically, a part in the −Z direction in the duct 92A extends along a discharging direction of the cooling gas by the first discharge fan 91A. A part in the +Z direction in the duct 92A is bent toward the second discharge fan 93A. As explained in detail below, the dimension of the first discharge fan 91A viewed from a circulating direction of the cooling gas to the first discharge fan 91A (the +Z direction) is smaller than the dimension of the second discharge fan 93A viewed from a circulating direction of the cooling gas to the second discharge fan 93A (the +Z direction).

The duct 92A includes an introducing section 921, a discharging section 922, a projecting section 923, and circulation ports 924 and 925.

The introducing section 921 is an introducing port for introducing the cooling gas discharged from the first discharge fan 91A into the duct 92A. The introducing section 921 is opposed to the intake surface 911 of the first discharge fan 91A.

The discharging section 922 is a discharge port for discharging the cooling gas having circulated in the duct 92A to the second discharge fan 93A. The discharging section 922 is opposed to an intake surface 931 of the second discharge fan 93A.

The projecting section 923 is a portion projecting further to the outer side than the first discharge fan 91A in the duct 92A. The circulation ports 924 and 925 are provided in the projecting section 923.

The circulation port 924 is provided on a surface crossing the +Z direction in the projecting section 923. The circulation port 925 is provided on a surface crossing the +X direction or the +Y direction orthogonal to the +Z direction in the projecting section 923. The circulation ports 924 and 925 are opened to the inside of the exterior housing 2 to cause the outside and the inside of the duct 92A to communicate. Therefore, when the second discharge fan 93A is driven, the cooling gas in the exterior housing 2 is introduced into the duct 92A via the circulation ports 924 and 925. That is, the circulation ports 924 and 925 circulate the cooling gas on the inside of the exterior housing 2 into the duct 92A. One circulation port of the circulation ports 924 and 925 may be absent.

Configuration of the Second Discharge Fan

The second discharge fan 93A is an axial fan that discharges the cooling gas discharged into the duct 92A from the first discharge fan 91A to the outside of the exterior housing 2 via the second opening section 212. When the second discharge fan 93A is driven, the cooling gas in the exterior housing 2 is introduced into the duct 92A via the circulation ports 924 and 925. Therefore, the second discharge fan 93A discharges, to the outside of the exterior housing 2, the cooling gas discharged into the duct 92A by the first discharge fan 91A and the cooling gas introduced into the duct 92A on the inside of the exterior housing 2.

A surface opposed to the first discharge fan 91A in the second discharge fan 93A is the intake surface 931 that sucks the cooling gas. A surface on the opposite side of the intake surface 931 in the second discharge fan 93A is an exhaust surface 932 that discharges the sucked cooling gas. The dimension of the intake surface 931 and the dimension of the exhaust surface 932 are substantially the same.

The second discharge fan 93A is disposed in the exterior housing 2 such that the exhaust surface 932 of the second discharge fan 93A faces a projecting direction of an image by the projection optical device 46 and a direction away from the projection optical device 46. Therefore, the second discharge fan 93A discharges the sucked cooling gas in a direction away from the first opening section 211 and the projection optical device 46. Consequently, gas having high temperature is suppressed from circulating to a projection range of the image by the projection optical device 46. Flickering such as shimmering is suppressed from occurring in a projected image.

Differences Between the Specifications of the First Discharge Fan and the Specifications of the Second Discharge Fan A discharge amount of the gas per unit time of the second discharge fan 93A is larger than a discharge amount of the gas per unit time of the first discharge fan 91A. Therefore, the second discharge fan 93A can suck all of the cooling gas discharged from the first discharge fan 91A and discharge the cooling gas to the outside of the exterior housing 2 via the second opening section 212. Further, the second discharge fan 93A can suck, using an excess discharge amount, the cooling gas in the exterior housing 2 flowing into the duct 92A and discharge the cooling gas to the outside of the exterior housing 2 via the second opening section 212.

The dimension of the second discharge fan 93A viewed along the circulating direction of the cooling gas to the second discharge fan 93A (the +Z direction) is larger than the dimension of the first discharge fan 91A viewed along the circulating direction of the cooling gas to the first discharge fan 91A (the +Z direction). That is, the area of the intake surface 931 of the second discharge fan 93A is larger than the area of the intake surface 911 of the first discharge fan 91A. Therefore, the discharge amount of the cooling gas per unit time of the second discharge fan 93A can be easily set larger than the discharge amount of the cooling gas per unit time of the first discharge fan 91A. Consequently, the number of revolutions per unit time of the second discharge fan 93A can be set smaller than the number of revolutions per unit time of the first discharge fan 91A. Therefore, noise such as wind noise leaking to the outside of the projector 1A can be reduced. That is, by using the two first and second discharge fans 91A and 93A, the numbers of revolutions per unit time of the discharge fans 91A and 93A can be reduced compared with, when one discharge fan is used, the number of revolutions per unit time of the one discharge fan. Besides, the number of revolutions per unit time of the second discharge fan 93A can be set smaller than the number of revolutions per unit time of the first discharge fan 91A. Consequently, noise can be reduced.

The entire first discharge fan 91A is covered by the second discharge fan 93A when viewed from a discharging direction of the cooling gas by the second discharge fan 93A (the +Z direction). Therefore, it is possible to improve discharging efficiency of the cooling gas having cooled the light source device 3, which is the cooling target, and suppress an increase in the size of the projector 1A while further achieving a reduction in noise. In other words, it is possible to improve cooling efficiency of the light source device 3 and suppress an increase in the size of the projector 1A while further achieving a reduction in noise.

Effects of the First Embodiment

The projector 1A according to this embodiment achieves effects described below.

The projector 1A includes the light source device 3, the image projection device 4 that modulates light emitted from the light source device 3 to generate image light and projects the image light, the power supply device 5 that supplies electric power to the light source device 3 and the image projection device 4, the exterior housing 2 that houses the light source device 3, the image projection device 4, and the power supply device 5, the first discharge fan 91A that sets the light source device 3 as a cooling target and sucks gas from the light source device 3 and discharges the gas, the second discharge fan 93A that discharges the gas discharged by the first discharge fan 91A and the gas in the exterior housing 2 to the outside of the exterior housing 2, and the duct 92A for circulating the gas discharged by the first discharge fan 91A to the second discharge fan 93A.

With such a configuration, the gas can be circulated to the light source device 3 by the first discharge fan 91A. Besides, the gas having cooled the light source device 3 can be sucked and discharged to the duct 92A.

The duct 92A can rectify the gas having circulated from the first discharge fan 91A and circulate the gas in the duct 92A. Therefore, the gas circulating in the duct 92A is easily sucked by the second discharge fan 93A and discharged to the outside of the exterior housing 2. Therefore, the cooling gas having cooled the light source device 3 and having heat can be quickly discharged to the outside of the exterior housing 2. Consequently, circulation efficiency of the gas is improved. Eventually, the cooling efficiency of the light source device 3, which is the cooling target, can be improved.

When viewed from the discharging direction of the gas by the second discharge fan 93A, entire one fan of the first discharge fan 91A and the second discharge fan 93A is covered by the other fan.

With such a configuration, when viewed from a discharging direction of the gas by one fan of the first discharge fan 91A and the second discharge fan 93A, the first discharge fan 91A and the second discharge fan 93A can be compactly disposed compared with when the one fan is disposed to project to the outer side of the other fan. Therefore, it is possible to suppress the projector 1A from increasing in size while improving the cooling efficiency of the light source device 3.

In the projector 1A, the duct 92A includes the circulation ports 924 and 925 opened to the inside of the exterior housing 2 to cause the gas on the inside of the exterior housing 2 to circulate into the duct 92A.

With such a configuration, not only the gas discharged from the first discharge fan 91A but also the gas having circulated in the exterior housing 2 can be discharged by the second discharge fan 93A. Therefore, since it is unnecessary to separately provide a fan that discharges the gas in the exterior housing 2, it is possible to suppress constituent components of the projector 1A from increasing. Besides, it is possible to suppress an increase in the size of the projector 1A.

In the projector 1A, a discharge amount of the gas per unit time of the second discharge fan 93A is larger than a discharge amount of the gas per unit time of the first discharge fan 91A.

With such a configuration, all of the gas discharged from the first discharge fan 91A can be quickly discharged to the outside of the exterior housing 2 by the second discharge fan 93A. Therefore, it is possible to suppress the gas having cooled the light source device 3 and having increased temperature from stagnating in the projector 1A. Therefore, it is possible to improve the cooling efficiency of the light source device 3.

In the projector 1A, the dimension of the second discharge fan 93A viewed along the circulating direction of the gas to the second discharge fan 93A is equal to or larger than the dimension of the first discharge fan 91A viewed along the circulating direction of the gas to the first discharge fan 91A.

When the dimension of the second discharge fan 93A is larger than the dimension of the first discharge fan 91A, a discharge amount of the gas per unit time of the second discharge fan 93A can be easily set larger than a discharge amount of the gas per unit time of the first discharge fan 91A.

When the dimension of the second discharge fan 93A is larger than the dimension of the first discharge fan 91A and the discharge amount of the gas per unit time of the second discharge fan 93A is the same as the discharge amount of the gas per unit time of the first discharge fan 91A, the number of revolutions per unit time of the second discharge fan 93A can be set smaller than the number of revolutions per unit time of the first discharge fan 91A. By using the two discharge fans 91A and 93A, the numbers of revolutions per unit time of the discharge fans 91A and 93A can be set lower than, when one discharge fan is used, the number of revolutions per unit time of the one discharge fan. Consequently, noise leaking to the outside of the exterior housing 2 can be reduced. Further, since the dimension of the second discharge fan 93A is larger than the dimension of the first discharge fan 91A, when viewed from the discharging direction of the gas by the second discharge fan 93A, the entire first discharge fan 91A can be easily covered by the second discharge fan 93A.

On the other hand, when the dimension of the second discharge fan 93A is the same as the dimension of the first discharge fan 91A, fans of the same standard can be adopted as the first discharge fan 91A and the second discharge fan 93A. Therefore, it is possible to suppress an increase in manufacturing cost of the projector 1A.

In the projector 1A, the image projection device 4 includes the projection optical device 46 that projects image light. The exterior housing 2 includes the front surface 21 disposed in the projecting direction of the image light by the image projection device 4. The front surface 21 includes the first opening section 211 from which a part of the projection optical device 46 is exposed and the second opening section 212 through which the gas discharged by the second discharge fan 93A circulates. The second discharge fan 93A discharges the cooling gas in the direction away from the first opening section 211.

With such a configuration, the gas having high temperature discharged to the outside of the exterior housing 2 via the second opening section 212 by the second discharge fan 93A can be suppressed from circulating to the first opening section 211. Accordingly, it is possible to suppress the gas having high temperature from circulating in a projection range of the image light by the projection optical device 46. Therefore, it is possible to suppress deterioration such as shimmering from occurring in a projected image.

In the projector 1A, all of the cooling gas discharged from the first discharge fan 91A circulates to the second discharge fan 93A.

With such a configuration, the gas having cooled the light source device 3, which is the cooling target, can be easily discharged to the outside of the exterior housing 2 by the second discharge fan 93A. Therefore, it is possible to suppress the gas having heat from stagnating in the exterior housing 2. It is possible to improve the cooling efficiency of the light source device 3.

In the projector 1A, the cooling target is the light source device 3.

If cooling of the light source device 3 is not appropriately performed, the luminance of a projected image decreases. Besides, the light source device 3 is easily deteriorated and the life of the light source device 3 decreases. In contrast, when the cooling target is the light source device 3, since the cooling efficiency of the light source device 3 can be improved, it is possible to suppress the luminance of the projected image from decreasing. Besides, it is possible to achieve extension of the life of the light source device 3 and the life of the projector 1A.

First Modification of the First Embodiment

In the projector 1A, the discharge device 9A includes the first discharge fan 91A and the second discharge fan 93A having a dimension larger than the dimension of the first discharge fan 91A when viewed along the circulating direction of the gas. However, not only this, but the dimension of the first discharge fan and the dimension of the second discharge fan may be substantially the same when viewed along the circulating direction of the gas. That is, the first discharge fan and the second discharge fan may be fans of the same standard.

Figure 4:
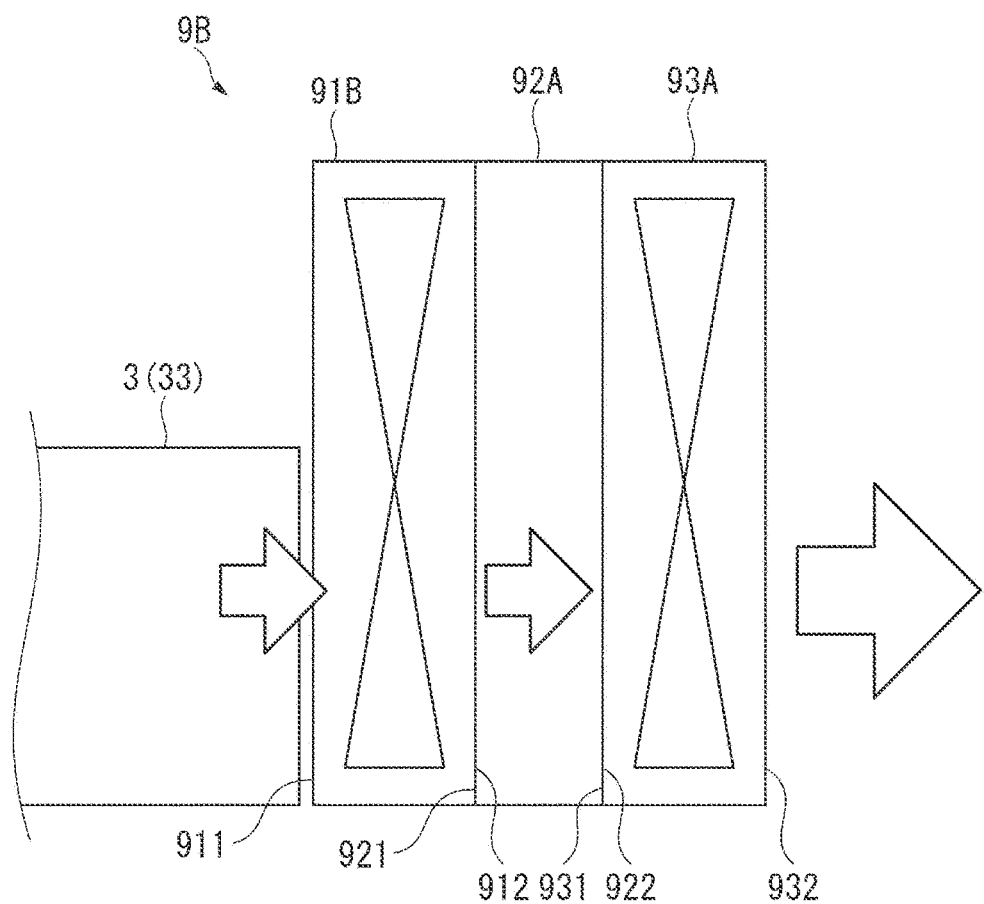
FIG. 4 is a schematic diagram showing the configuration of a discharge device according to a first modification of the first embodiment.

FIG. 4 is a diagram schematically showing a cross section of a discharge device 9B along the YZ plane.

For example, the discharge device 9B shown in FIG. 4 may be adopted in the projector 1A instead of the discharge device 9A.

The discharge device 9B includes the same components and functions as the components and the functions of the discharge device 9A except that the discharge device 9B includes a first discharge fan 91B instead of the first discharge fan 91A.

The first discharge fan 91B is an axial fan that sucks the gas having cooled the light source device 3 and discharges the gas into the duct 92A. The first discharge fan 91B has substantially the same dimension as the dimension of the second discharge fan 93A when viewed from the +Z direction, which is the circulating direction of the gas to the first discharge fan 91B. Specifically, the first discharge fan 91B and the second discharge fan 93A are fans of the same standard. The area of the intake surface 911 of the first discharge fan 91B is the same as the area of the intake surface 931 of the second discharge fan 93A. The first discharge fan 91B sucks, with the intake surface 911 opposed to the heat radiating member 33, the gas having cooled the heat radiating member 33 and the gas having cooled the light source device 3 and discharges the gas to the duct 92A.

In the duct 92A of the discharge device 9B, at least one circulation port of the circulation ports 924 and 925 may be absent. When each of the circulation ports 924 and 925 is absent in the duct 92A, rotating speed of the first discharge fan 91B and rotating speed of the second discharge fan 93A may be the same and a discharge amount of the gas per unit time of the first discharge fan 91B and a discharge amount of the gas per unit time of the second discharge fan 93A may be the same.

The projector 1A including such a discharge device 9B instead of the discharge device 9A achieves the same effects as the effects of the projector 1A including the discharge device 9A.

Besides, since fans of the same standard can be adopted as the first discharge fan 91B and the second discharge fan 93A, it is possible to reduce manufacturing cost of the discharge device 9B and manufacturing cost of the projector 1A.

Second Modification of the First Embodiment

In the discharge device 9A, the second discharge fan 93A is driven, whereby the gas in the exterior housing 2 circulates into the duct 92A via the circulation ports 924 and 925 and is discharged to the outside of the exterior housing 2 by the second discharge fan 93A. However, not only this, but the gas in the exterior housing 2 may be circulated in the duct by the first discharge fan. That is, the first discharge fan may suck the gas having cooled the cooling target and suck the gas in the exterior housing 2.

Figure 5:
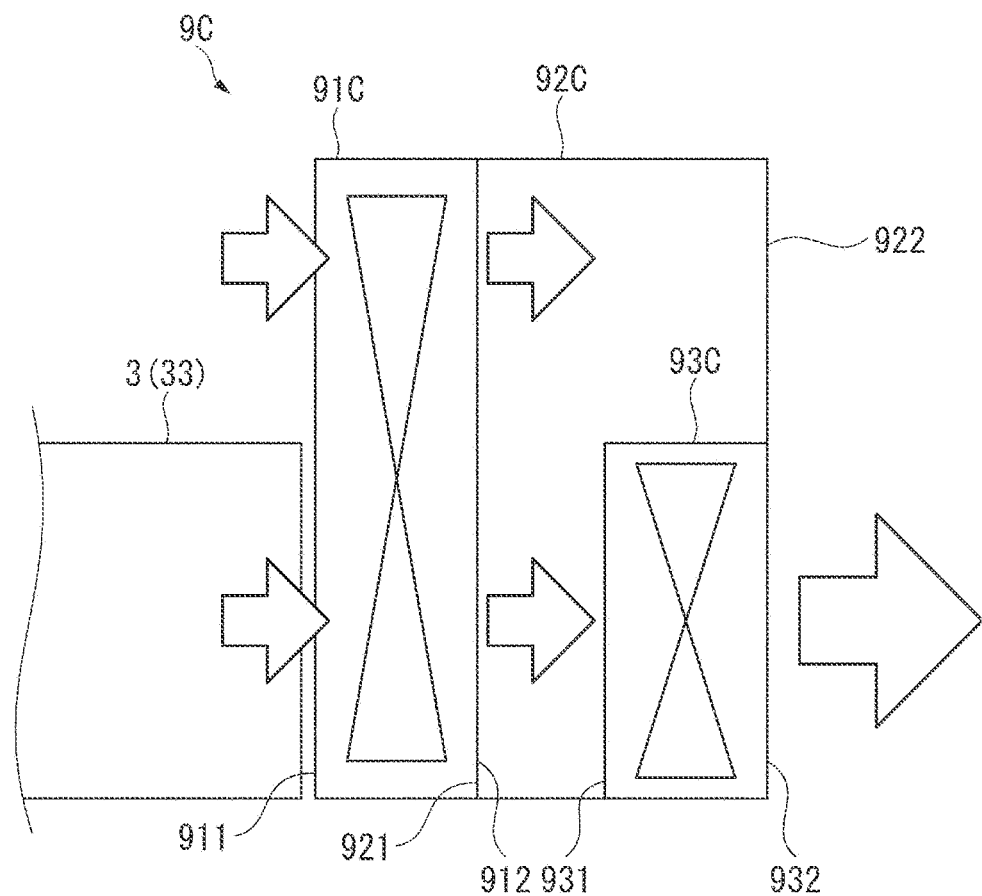
FIG. 5 is a schematic diagram showing the configuration of a discharge device according to a second modification of the first embodiment.

FIG. 5 is a diagram schematically showing a cross section of a discharge device 9C along the YZ plane.

For example, the discharge device 9C shown in FIG. 5 may be adopted in the projector 1A instead of the discharge device 9A.

The discharge device 9C includes a first discharge fan 91C, a duct 92C, and a second discharge fan 93C and acts in the same manner as the discharge device 9A.

Specifically, like the first discharge fans 91A and 91B, the first discharge fan 91C is an axial fan that sucks the gas having cooled the light source device 3 and discharges the gas into the duct 92C. When viewed from the +Z direction, the first discharge fan 91C is larger than the heat radiating member 33 of the light source device 3. The heat radiating member 33 is covered by the first discharge fan 91C in the +Z direction. Therefore, the first discharge fan 91C sucks not only the gas having cooled the heat radiating member 33 but also the gas in the exterior housing 2 and discharges the gas into the duct 92C.

The duct 92C connects the first discharge fan 91C and the second discharge fan 93C and circulates all of the cooling gas discharged by the first discharge fan 91C to the second discharge fan 93C.

Like the duct 92A, the duct 92C includes the introducing section 921 and the discharging section 922. However, the duct 92C does not include the projecting section 923 and the circulation ports 924 and 925. Therefore, the gas circulating into the duct 92C is the gas discharged from the first discharge fan 91C.

The second discharge fan 93C is an axial fan that sucks the cooling gas in the duct 92C and discharges the cooling gas to the outside of the exterior housing 2 via the second opening section 212. The second discharge fan 93C is a small fan compared with the first discharge fan 91C and is disposed in the duct 92C. Therefore, a part of the gas discharged into the duct 92C by the first discharge fan 91C is sucked by the second discharge fan 93C and discharged to the outside of the exterior housing 2. The remaining gas is discharged to the outside of the exterior housing 2 from the discharging section 922 of the duct 92C. A discharge amount of the gas per unit time of the second discharge fan 93C may be larger than a discharge amount of the gas per unit time of the first discharge fan 91C.

The projector 1A including such a discharge device 9C instead of the discharge device 9A achieves the same effects as the effects of the projector 1A including the discharge device 9A.

Third Modification of the First Embodiment

In the discharge device 9A, when viewed from the +Z direction, the first discharge fan 91A and the second discharge fan 93A are larger than the light source device 3. However, not only this, but, when viewed from the +Z direction, the dimension of the first discharge fan and the dimension of the second discharge fan may be substantially the same as the dimension of the heat radiating member 33.

In the discharge device 9C, the gas discharged into the duct 92C from the first discharge fan 91C is sucked by the second discharge fan 93C and discharged to the outside of the exterior housing 2 together with the gas in the exterior housing 2 having circulated into the duct 92C. However, not only this, but a partitioning section that partitions the gas circulating from the first discharge fan and the gas in the exterior housing circulating into the duct may be provided in the duct.

Figure 6:
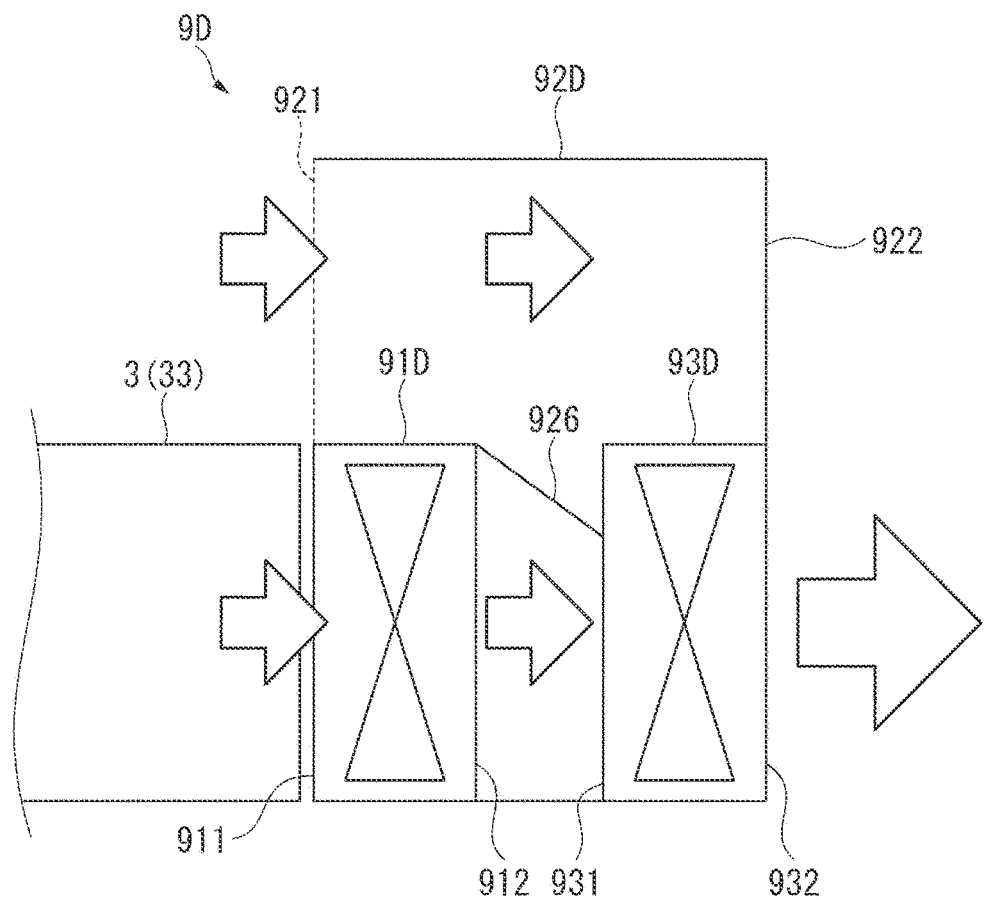
FIG. 6 is a schematic diagram showing the configuration of a discharge device according to a third modification of the first embodiment.

FIG. 6 is a diagram schematically showing a cross section of a discharge device 9D along the YZ plane.

For example, the discharge device 9D shown in FIG. 6 may be adopted in the projector 1A instead of the discharge device 9A.

The discharge device 9D includes a first discharge fan 91D, a duct 92D, and a second discharge fan 93D.

The first discharge fan 91D is an axial fan that sucks the gas in the light source device 3 and discharges the gas into the duct 92D. The dimension in the +X direction in the first discharge fan 91D is substantially the same as the dimension in the +X direction in the heat radiating member 33 of the light source device 3. The dimension in the +Y direction in the first discharge fan 91D is substantially the same as the dimension in the +Y direction in the heat radiating member 33. That is, the first discharge fan 91D and the heat radiating member 33 of the light source device 3 overlap when viewed from the +Z direction, which is the circulating direction of the gas.

The duct 92D connects the first discharge fan 91D and the second discharge fan 93D and circulates all of the gas discharged by the first discharge fan 91D to the second discharge fan 93D. The duct 92D includes the introducing section 921, the discharging section 922, and a partitioning section 926.

The duct 92D is formed larger in the +Y direction than the first discharge fan 91D and the second discharge fan 93D. The first discharge fan 91D and the second discharge fan 93D are disposed in the duct 92D. Therefore, the gas sucked by the first discharge fan 91D circulates to the first discharge fan 91D via the introducing section 921 facing the −Z direction. The gas discharged from the second discharge fan 93D is discharged to the outside of the duct 92D and the outside of the exterior housing 2 via the discharging section 922 facing the +Z direction.

The partitioning section 926 partitions, in the duct 92D, the gas discharged from the first discharge fan 91D and the gas in the exterior housing 2 circulating into the duct 92D via the introducing section 921. That is, the partitioning section 926 is a partition plate that partitions the gas circulating into the duct 92D. The partitioning section 926 inclines and extends in the +Z direction and the +Y direction from the end portion in the +Y direction and the +Z direction in the first discharge fan 91D toward the second discharge fan 93D. That is, the partitioning section 926 extends further in the −Y direction from the end portion in the +Y direction and the +Z direction in the first discharge fan 91D toward the +Z direction. Therefore, the gas discharged from the first discharge fan 91D circulates to the second discharge fan 93D without mixing with the gas in the exterior housing 2 having circulated into the duct 92D via the introducing section 921.

The second discharge fan 93D is an axial fan having substantially the same size as the first discharge fan 91D. That is, the area of the intake surface 931 of the second discharge fan 93D and the area of the intake surface 911 of the first discharge fan 91D are the same. The area of the exhaust surface 932 of the second discharge fan 93D and the area of the exhaust surface 912 of the first discharge fan 91D are the same.

The second discharge fan 93D sucks the gas discharged by the first discharge fan 91D. The second discharge fan 93D sucks a part of the gas partitioned by the partitioning section 926 from the gas discharged by the first discharge fan 91D, that is, the gas in the exterior housing 2 having circulated into the duct 92D via the introducing section 921. The second discharge fan 93D discharges the sucked gas to the outside of the duct 92D via the discharging section 922.

In this embodiment, the discharge amount of the gas per unit time of the second discharge fan 93D is larger than the discharge amount of the gas per unit time of the first discharge fan 91D. Therefore, even if the second discharge fan 93D is a fan having substantially the same size as the first discharge fan 91D, the second discharge fan 93D can suck all of the gas discharged from the first discharge fan 91D and the gas in the exterior housing 2 having circulated into the duct 92D and discharge the gas to the outside of the exterior housing 2 via the second opening section 212.

Second Embodiment

A second embodiment of the present disclosure is explained.

A projector according to this embodiment includes the same configuration as the configuration of the projector 1A according to the first embodiment but is different in the configuration of the cooling device. In the following explanation, the same or substantially the same portions as the portions explained above are denoted by the same reference numerals and signs and explanation of the portions is omitted.

Figure 7:
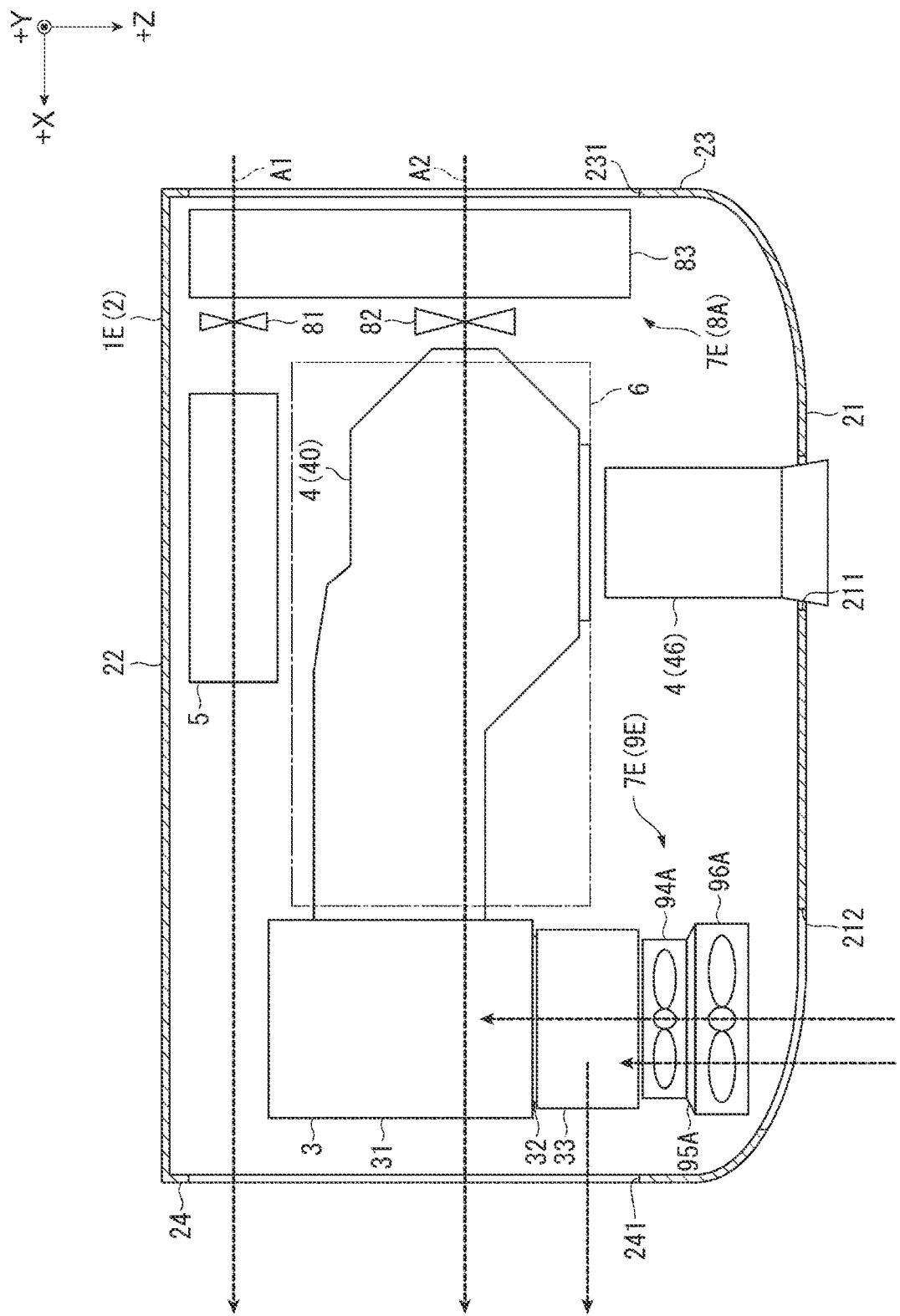
FIG. 7 is a schematic diagram showing the configuration of a projector according to a second embodiment.

FIG. 7 is a plan view showing the internal configuration of a projector 1E according to this embodiment.

The projector 1E includes the same components and functions as the components and the functions of the projector 1A according to the first embodiment except that the projector 1E includes a cooling device 7E instead of the cooling device 7A.

Configuration of the Cooling Device

The cooling device 7E cools a cooling target housed on the inside of the exterior housing 2. The cooling device 7E includes, as shown in FIG. 7, the supply device 8A and a supply device 9E.

In the cooling device 7E, a cooling gas introduced into the inside of the exterior housing 2 from the opening section 231 by the supply device 8A circulates in the +X direction. A cooling gas introduced into the inside of the exterior housing 2 from the second opening section 212 by the supply device 9E circulates in the −Z direction. A part of gas supplied by the supply device 9E circulates to the heat radiating member 33 of the light source device 3 and, thereafter, circulates in the +X direction and is discharged to the outside of the exterior housing 2 from the opening section 241. Another part of the gas supplied by the supply device 9E merges with the gas supplied from the second supply fan 82 of the supply device 8A, thereafter circulates in the +X direction and is discharged to the outside of the exterior housing 2 from the opening section 241. Gas supplied from the first supply fan 81 of the supply device 8A circulates in the +X direction in the exterior housing 2 and, thereafter, is discharged to the outside of the exterior housing 2 from the opening section 241. A discharge fan that discharges the gas in the exterior housing 2 to the outside of the exterior housing 2 via the opening section 241 may be provided in a position corresponding to the opening section 241 on the inside of the exterior housing 2.

The configuration of the supply device 9E is explained below. Since the configuration of the supply device 8A is as explained above, explanation about the supply device 8A is omitted.

Configuration of the Supply Device

Figure 8:
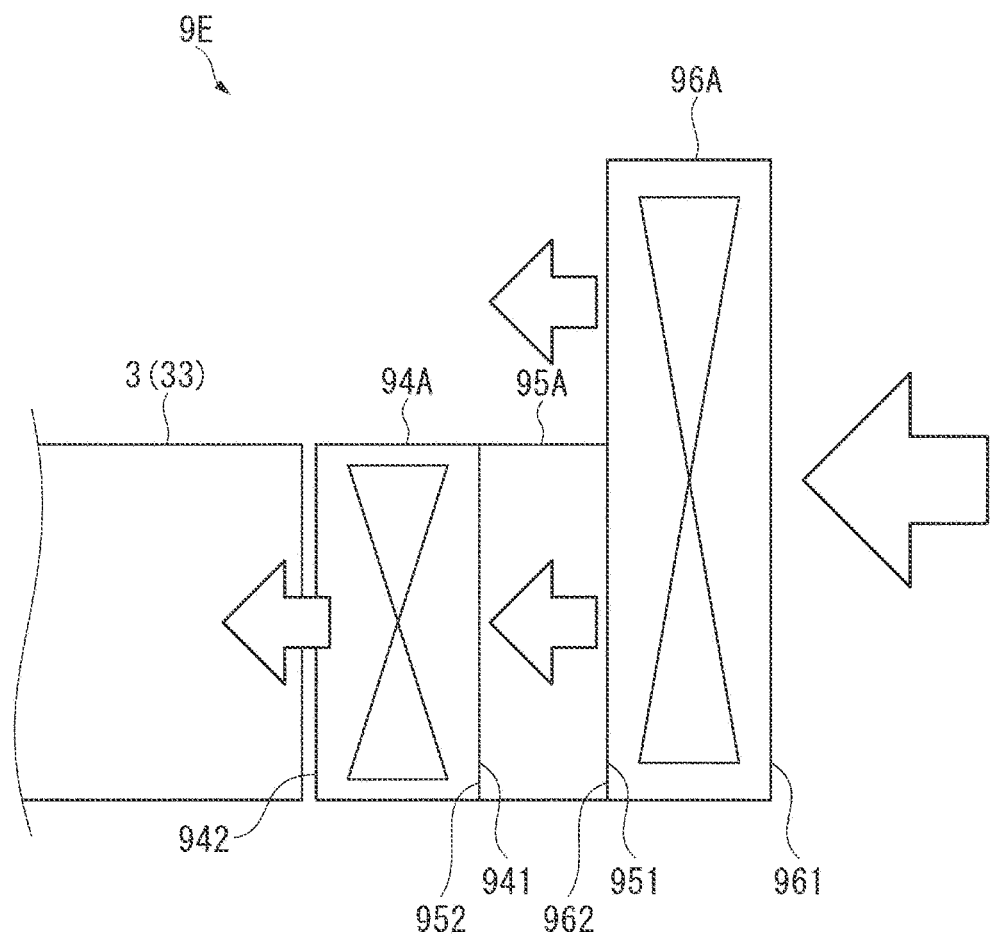
FIG. 8 is a schematic diagram showing the configuration of a supply device of a cooling device according to the second embodiment.

FIG. 8 is a diagram schematically showing a cross section of the supply device 9E along the YZ plane.

The supply device 9E is provided to correspond to the second opening section 212 in the exterior housing 2. The supply device 9E introduces gas on the outside of the exterior housing 2 into the inside of the exterior housing 2 as the cooling gas via the second opening section 212 and supplies the introduced cooling gas to a cooling target. The cooling target of the supply device 9E is the light source device 3 among the light source device 3, the image projection device 4, the power supply device 5, and the control device 6, which could be the cooling target. The supply device 9E includes, as shown in FIG. 7 and FIG. 8, a first supply fan 94A, a duct 95A, and a second supply fan 96A.

Configuration of the First Supply Fan

The first supply fan 94A is an axial fan that circulates the cooling gas to the light source device 3. Specifically, the first supply fan 94A circulates, to the light source device 3, the gas blown out from the second supply fan 96A and having circulated in the duct 95A. In this embodiment, all of the gas blown out by the second supply fan 96A circulates in the duct 95A and circulates to the light source device 3 via the first supply fan 94A.

A surface opposed to the duct 95A in the first supply fan 94A is an intake surface 941 that sucks gas in the duct 95A. A surface provided on the opposite side of the intake surface 941 in the first supply fan 94A is an exhaust surface 942 that discharges the cooling gas sucked by the intake surface 941 toward the light source device 3. The dimension in the +Y direction of the exhaust surface 942 is substantially the same as the dimension in the +Y direction of the light source device 3 when viewed from the first supply fan 94A. That is, the first supply fan 94A overlaps the light source device 3 when viewed from a circulating direction of the gas with respect to the first supply fan 94A. The area of the intake surface 941 and the area of the exhaust surface 942 are substantially the same.

Configuration of the Duct

The duct 95A connects the first supply fan 94A and the second supply fan 96A and circulates the gas supplied by the second supply fan 96A to the first supply fan 94A. The duct 95A includes the same configuration as the configuration of the duct 92A according to the first embodiment. However, a circulating direction of the gas is different. Specifically, in the duct 92A according to the first embodiment, the gas circulates along the +Z direction. However, in the duct 95A according to the second embodiment, the gas circulates along the −Z direction. The duct 95A includes an introducing section 951 and a discharging section 952.

The introducing section 951 is an opening section for introducing the gas discharged from the second supply fan 96A into the duct 95A. The introducing section 951 is opposed to an exhaust surface 962 of the second supply fan 96A.

The discharging section 952 is an opening section for guiding the cooling gas having circulated in the duct 95A to the first supply fan 94A. The discharge section 952 is opposed to the intake surface 941 of the first supply fan 94A.

Configuration of the Second Supply Fan

The second supply fan 96A is an axial fan that sucks the gas on the outside of the exterior housing 2 and supplies the gas to the first supply fan 94A. Specifically, the second supply fan 96A sucks the gas on the outside of the exterior housing 2 into the exterior housing 2 via the second opening section 212. The second supply fan 96A supplies a part of the sucked gas into the duct 95A as the cooling gas. The second supply fan 96A supplies the remainder of the sucked gas into the exterior housing 2 as the cooling gas from a position in the +Y direction with respect to the duct 95A.

The second supply fan 96A is disposed substantially in parallel to the first supply fan 94A along the +Z direction. That is, the second supply fan 96A is not disposed to be inclined with respect to the first supply fan 94A. That is, the first supply fan 94A and the second supply fan 96A are disposed to overlap when viewed from the circulating direction of the gas (the +Z direction). In other words, the entire first supply fan 94A is covered by the second supply fan 96A when viewed from the circulating direction of the gas (the +Z direction). The second supply fan 96A includes an intake surface 961 that sucks the gas from the outside of the exterior housing 2 and the exhaust surface 962 that supplies the gas to the duct 95A.

Differences Between the Specifications of the First Supply Fan and the Specifications of the Second Supply Fan A supply amount of the gas per unit time of the second supply fan 96A is larger than a supply amount of the gas per unit time of the first supply fan 94A. Therefore, in addition to the first supply fan 94A, the second supply fan 96A can supply the cooling gas into the exterior housing 2. The dimension of the second supply fan 96A is larger than the dimension of the first supply fan 94A when viewed from the circulating direction of the gas (the +Z direction). That is, the area of the exhaust surface 962 of the second supply fan 96A is larger than the area of the intake surface 941 of the first supply fan 94A. In other words, the dimension of the first supply fan 94A and the dimension of the second supply fan 96A are different when viewed from the circulating direction of the gas (the +Z direction). Therefore, a supply amount of the cooling gas per unit time of the second supply fan 96A can be set larger than a supply amount of the cooling gas per unit time of the first supply fan 94A. Consequently, the number of revolutions per unit time of the second supply fan 96A can be set smaller than the number of revolutions per unit time of the first supply fan 94A. Besides, noise such as wind noise leaking to the outside of the projector 1E can be reduced. That is, by using the two supply fans 94A and 96A, the numbers of revolutions per unit time of the supply fans 94A and 96A can be set lower than, when one supply fan is used, the number of revolutions per unit time of the one supply fan. The number of revolutions per unit time of the second supply fan 96A can be set smaller than the number of revolutions per unit time of the first supply fan 94A. Consequently, noise leaking to the outside of the exterior housing 2 can be reduced.

Effects of the Second Embodiment

The projector 1E according to this embodiment explained above achieves effects described below.

The projector 1E includes the light source device 3, the image projection device 4 that modulates light emitted from the light source device 3 to generate image light and projects the image light, the power supply device 5 that supplies electric power to the light source device 3 and the image projection device 4, the exterior housing 2 that houses the light source device 3, the image projection device 4, and the power supply device 5, the first supply fan 94A that sets at least one device of the light source device 3, the image projection device 4, and the power supply device 5 as a cooling target and supplies gas to the cooling target, the second supply fan 96A that supplies gas sucked from the outside of the exterior housing 2 to the first supply fan 94A, and the duct 95A for circulating the gas supplied by the second supply fan 96A to the first supply fan 94A. The first supply fan 94A supplies the gas supplied by the second supply fan 96A to the cooling target to cool the cooling target. One fan of the first supply fan 94A and the second supply fan 96A supplies a part of the sucked gas to the inside of the exterior housing 2.

With such a configuration, the gas sucked from the outside of the exterior housing 2 by the second supply fan 96A is supplied to the first supply fan 94A via the duct 95A and supplied to the cooling target by the first supply fan 94A. Therefore, compared with a configuration in which the duct 95A is not provided, the gas supplied by the second supply fan 96A can be rectified and circulated into the duct 95A. The gas blown out from the second supply fan 96A can be quickly supplied to the cooling target by the first supply fan 94A. Consequently, it is possible to improve cooling efficiency of the cooling target.

In the projector 1E, one fan of the first supply fan 94A and the second supply fan 96A supplies a part of the sucked gas to the inside of the exterior housing 2. When viewed from the opposite direction of a supply direction of the gas by the second supply fan 96A, entire one fan of the first supply fan 94A and the second supply fan 96A is covered by the other fan.

With such a configuration, when viewed from the opposite direction of the supply direction of the gas by the second supply fan 96A, entire one fan of the first supply fan 94A and the second supply fan 96A is covered by the other fan. Consequently, compared with when one fan of the first supply fan 94A and the second supply fan 96A is disposed to project to the outer side of the other fan, the first supply fan 94A and the second supply fan 96A can be compactly disposed.

Therefore, it is possible to suppress the projector 1E from increasing in size while improving the cooling efficiency of the cooling target.

In the projector 1E, the dimension of the first supply fan 94A viewed from the circulating direction of the gas to the first supply fan 94A and the dimension of the second supply fan 96A viewed from the circulating direction of the gas to the second supply fan 96A are different.

With such a configuration, after the specifications of the first supply fan 94A is determined according to the cooling target, in selecting the second supply fan 96A having performance equal to or higher than performance of the first supply fan 94A, it is possible to improve selection flexibility for the second supply fan 96A.

In the projector 1E, of the first supply fan 94A and the second supply fan 96A, a fan having a small dimension when viewed from the circulating direction of the gas overlaps the cooling target when viewed from the circulating direction of the gas.

With such a configuration, it is possible to efficiently circulate the gas to the cooling target. Therefore, it is possible to improve the cooling efficiency of the cooling target.

First Modification of the Second Embodiment

In the supply device 9E, the dimension of the second supply fan 96A is larger than the dimension of the first supply fan 94A. However, not only this, but the dimension of the first supply fan may be substantially the same as the dimension of the second supply fan.

Figure 9:
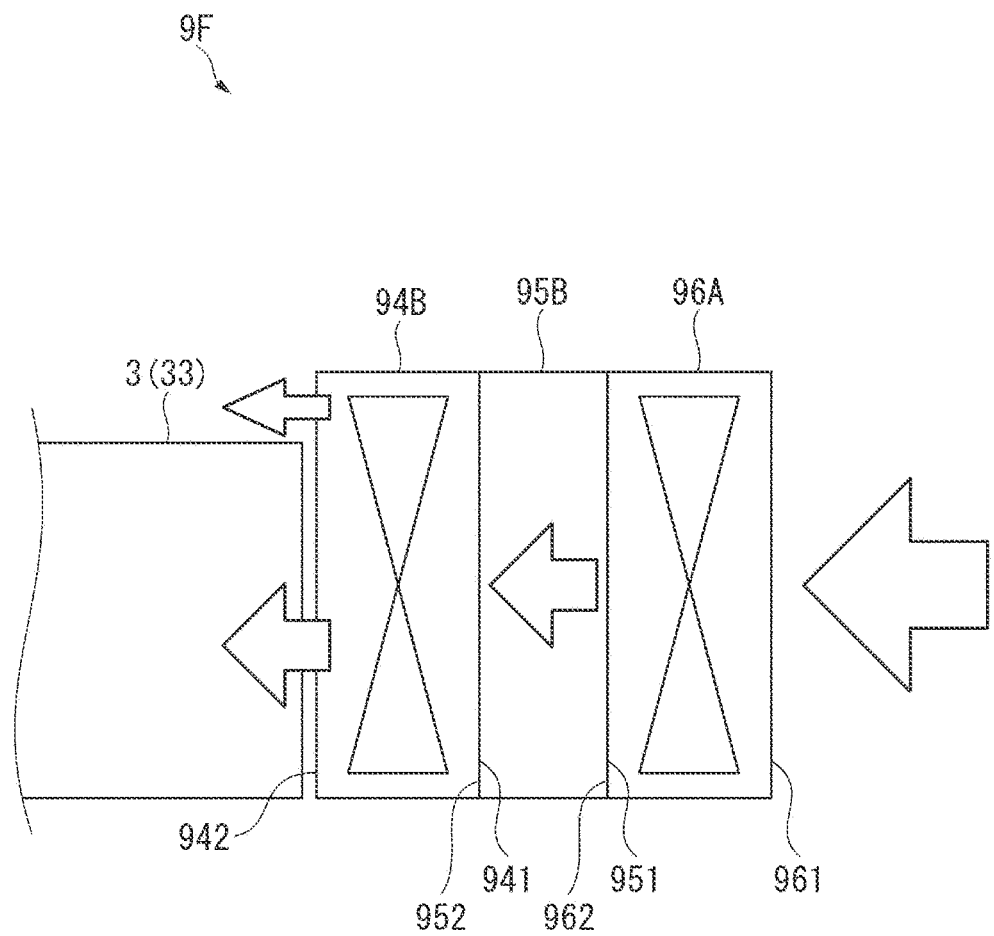
FIG. 9 is a schematic diagram showing the configuration of a supply device according to a first modification of the second embodiment.

FIG. 9 is a schematic diagram showing a cross section of a supply device 9F, which is a first modification of the supply device 9E, along the YZ plane.

For example, the supply device 9F shown in FIG. 9 may be adopted in the projector 1E instead of the supply device 9E.

The supply device 9F includes the same components and functions as the components and the functions of the supply device 9E except that the supply device 9F includes a first supply fan 94B and a duct 95B instead of the first supply fan 94A and the duct 95A.

The first supply fan 94B is an axial fan that supplies the gas to the light source device 3, which is the cooling target, and the inside of the exterior housing 2. The first supply fan 94B has substantially the same dimension as the dimension of the second supply fan 96A when viewed from the circulating direction of the gas (the +Z direction). That is, the area of the intake surface 941 of the first supply fan 94B is substantially the same as the area of the intake surface 961 of the second supply fan 96A. In other words, the dimension of the first supply fan 94B and the dimension of the second supply fan 96A are substantially the same when viewed from the circulating direction of the gas to the first supply fan 94B (the +Z direction). In the first supply fan 94B, a surface on the opposite side of the intake surface 941 is the exhaust surface 942 that discharges the sucked gas. The first supply fan 94B discharges the cooling gas from a region located on the +Y direction side with respect to the heat radiating member 33 on the exhaust surface 942 into the exterior housing 2.

The duct 95B circulates the gas supplied by the second supply fan 96A to the first supply fan 94B. The duct 95B includes the introducing section 951 that introduces the cooling gas discharged from the second supply fan 96A into the duct 95B and the discharging section 952 that discharges the cooling gas having circulated in the duct 95B to the first supply fan 94B.

In the projector 1E, the dimension of the first supply fan 94B viewed from the circulating direction of the gas to the first supply fan 94B and the dimension of the second supply fan 96A viewed from the circulating direction of the gas to the second supply fan 96A are substantially the same.

With such a configuration, fans of the same standard can be adopted as the first supply fan 94B and the second supply fan 96A. Therefore, it is possible to suppress an increase in manufacturing cost of the projector. Second modification of the second embodiment.

In the supply device 9E, the dimension of the second supply fan 96A is larger than the dimension of the first supply fan 94A. However, not only this, but the dimension of the first supply fan may be larger than the dimension of the second supply fan.

Figure 10:
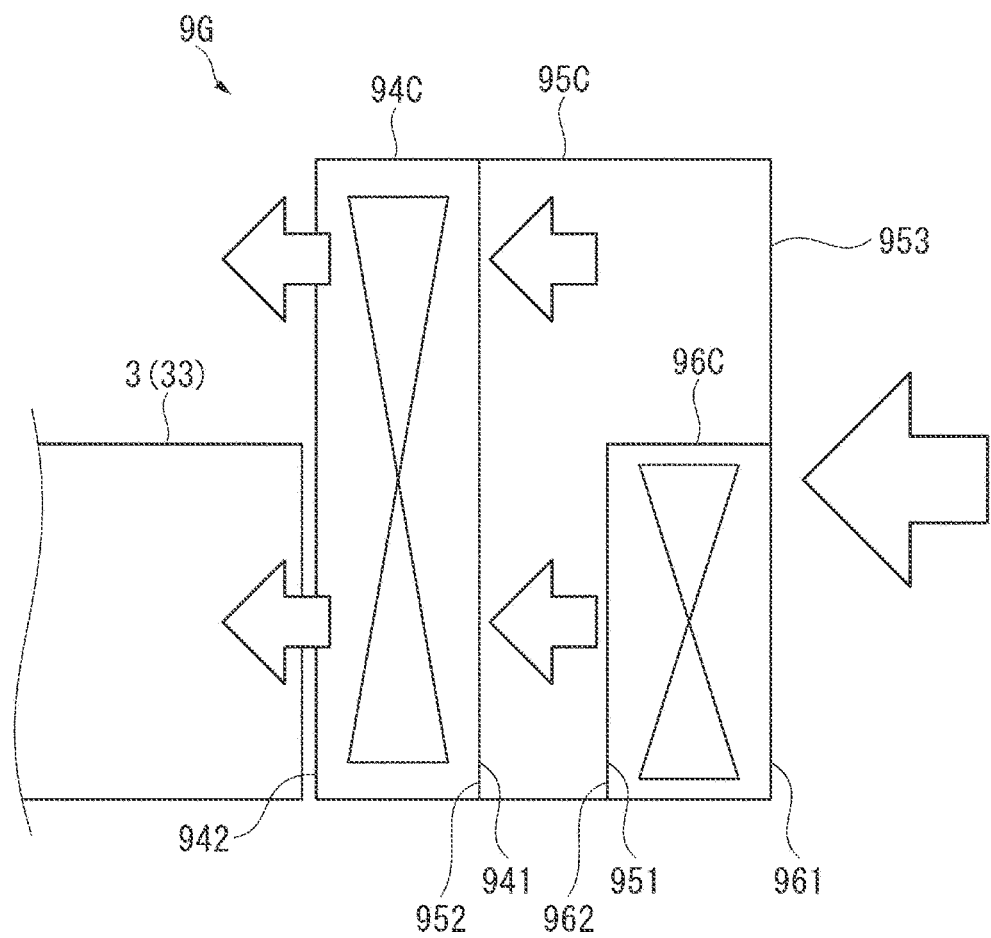
FIG. 10 is a schematic diagram showing the configuration of a supply device according to a second modification of the second embodiment.

FIG. 10 is a schematic diagram showing a cross section of a supply device 9G, which is a second modification of the supply device 9E, along the YZ plane.

For example, the supply device 9G shown in FIG. 10 may be adopted in the projector 1E instead of the supply device 9E.

The supply device 9G includes a first supply fan 94C, a duct 95C, and a second supply fan 96C.

The first supply fan 94C supplies the gas to the cooling target and the inside of the exterior housing 2. The first supply fan 94C has a large dimension in the +Y direction with respect to the light source device 3 when viewed from the circulating direction of the gas (the +Z direction). The dimension of the first supply fan 94C is larger than the dimension of the second supply fan 96C explained below. That is, the area of the intake surface 941 of the first supply fan 94C is larger than the area of the intake surface 961 of the second supply fan 96C. In the first supply fan 94C, a surface on the opposite side of the intake surface 941 is the exhaust surface 942 that sucks gas in the duct 95C.

The duct 95C connects the first supply fan 94C and the second supply fan 96C and circulates the gas supplied by the second supply fan 96C to the first supply fan 94C. The duct 95C includes the introducing section 951 that guides the gas having circulated from the outside of the exterior housing 2 to the inside of the exterior housing 2 by the second supply fan 96C into the duct 95C, the discharging section 952 that guides the cooling gas having circulated in the duct 95C to the first supply fan 94C, and a projecting section 953 that projects in the +Y direction with respect to the second supply fan 96C.

The second supply fan 96C is an axial fan that supplies the gas sucked from the outside of the exterior housing 2 to the duct 95C and supplies the gas to the first supply fan 94C via the duct 95C. The second supply fan 96C overlaps the light source device 3 when viewed from the circulating direction of the gas (the +Z direction). The area of the intake surface 961 of the second supply fan 96C is smaller than the area of the intake surface 941 of the first supply fan 94C. A surface on the opposite side of the intake surface 961 in the second supply fan 96C is the exhaust surface 962 that discharges the gas to the duct 95C.

A supply amount per unit time of the first supply fan 94C is larger than a supply amount per unit time of the second supply fan 96C. Therefore, even if the supply amount of the second supply fan 96C is small with respect to the supply amount of the first supply fan 94C, since the size of the first supply fan 94C is a size corresponding to the light source device 3, which is the cooling target, the first supply fan 94C can discharge the gas sufficiently capable of cooling the cooling target.

Third Modification of the Second Embodiment

In the cooling device 7A, the duct 92A includes the circulation ports 924 and 925. The gas is circulated from the inside of the exterior housing 2 into the duct 92A by the circulation ports 924 and 925. However, not only this, but a partitioning section that divides the gas having circulated in the duct from the gas discharged toward the light source device 3 by the first supply fan may be provided.

Figure 11:
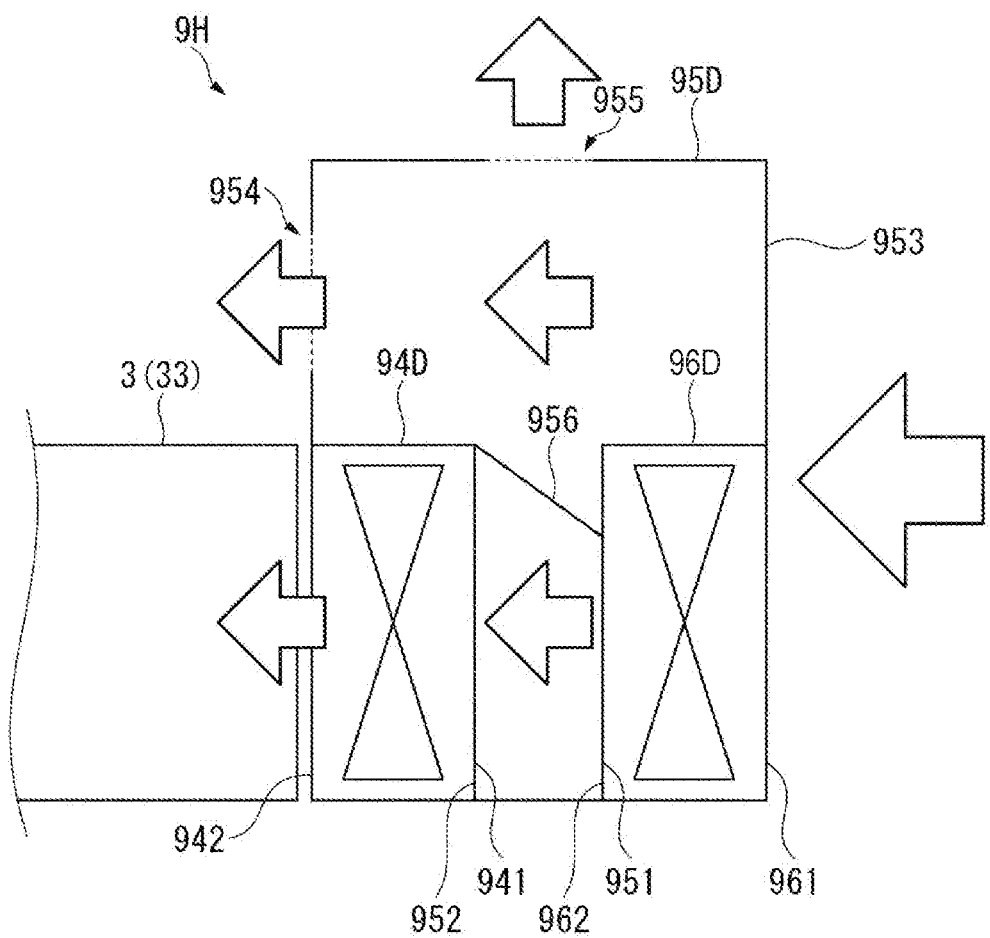
FIG. 11 is a schematic diagram showing the configuration of a supply device according to a third modification of the second embodiment.

FIG. 11 is a schematic diagram showing a cross section of a supply device 9H, which is a third modification of the supply device 9E, along the YZ plane.

For example, the supply device 9H shown in FIG. 11 may be adopted in the projector 1E instead of the supply device 9E.

The supply device 9H includes the same components and functions as the components and the functions of the supply device 9E except that the supply device 9H includes a first supply fan 94D and a duct 95D.

The first supply fan 94D is an axial fan that supplies the gas to the light source device 3. The first supply fan 94D overlaps the light source device 3 when viewed from the circulating direction of the gas (the +Z direction). The first supply fan 94D includes the intake surface 941 that sucks the gas in the duct 95D.

The area of the intake surface 941 is substantially the same as the area of the intake surface 961 of the second supply fan 96D.

Therefore, all of the gas discharged from the first supply fan 94D circulates to the light source device 3. A surface on the opposite side of the intake surface 941 in the first supply fan 94D is the exhaust surface 942 that discharges the sucked gas into the light source device 3.

The duct 95D connects the first supply fan 94D and the second supply fan 96D and circulates the gas supplied by the second supply fan 96D to the first supply fan 94D. The duct 95D projects in the +Y direction with respect to the first supply fan 94D and the second supply fan 96D. The duct 95D includes the introducing section 951, the discharging section 952, and the projecting section 953.

The introducing section 951 is an opening section that guides the cooling gas discharged from the second supply fan 96D into the duct 95D. The introducing section 951 is opposed to the exhaust surface 962 of a second supply fan 96D.

The discharging section 952 is an opening section that discharges the cooling gas having circulated in the duct 95D to the first supply fan 94D. The discharging section 952 is opposed to the intake surface 941 of the first supply fan 94D.

The projecting section 953 is a portion projecting further to the outer side than the first supply fan 94D and the second supply fan 96D in the duct 95D. In the projecting section 953, circulation ports 954 and 955 and a partitioning section 956 are provided.

The circulation port 954 is provided on a surface crossing the +Z direction in the projecting section 953. The circulation port 955 is provided on a surface crossing the +X direction or the +Y direction orthogonal to the +Z direction in the projecting section 953. The circulation ports 954 and 955 are opened to the inside of the exterior housing 2 to cause the outside and the inside of the duct 95D to communicate. Therefore, when the second supply fan 96D is driven, the second supply fan 96D discharges the cooling gas into the exterior housing 2 from the inside of the duct 95D via the circulation ports 954 and 955. That is, the circulation ports 954 and 955 circulate the cooling gas in the duct 95D to the inside of the exterior housing 2.

The partitioning section 956 divides the gas supplied by the second supply fan 96D into the gas supplied by the first supply fan 94D and the gas supplied to the inside of the exterior housing 2. That is, the partitioning section 956 is a partition plate that partitions the gas circulating to the inside of the duct 95D. The partitioning section 956 extends further in the −Y direction from the end portion in the +Y direction and the +Z direction in the first supply fan 94D toward the +Z direction. Therefore, the gas discharged from the second supply fan 96D circulates to the inside of the exterior housing 2 via the circulation ports 954 and 955 without mixing with the gas discharged to the light source device 3 by the first supply fan 94D.

The projector 1E including the duct 95D achieves effects described below.

In the projector 1E, the duct 95D includes the partitioning section 956 that divides the gas supplied by the second supply fan 96D into the gas supplied to the first supply fan 94D and the gas supplied to the inside of the exterior housing 2.

With such a configuration, the gas sucked from the outside of the exterior housing 2 by the second supply fan 96C can be supplied to the first supply fan 94D and the inside of the exterior housing 2. Therefore, compared with when a fan that introduces the gas on the outside of the exterior housing 2 into the inside of the exterior housing 2 is separately provided, it is possible to suppress an increase in the number of components of the projector 1E.

Third Embodiment

A third embodiment of the present disclosure is explained.

A projector according to this embodiment includes the same configuration as the configuration of the projector 1A according to the first embodiment but is different in the configurations of an exterior housing and a cooling device. In the following explanation, the same portions as the portions explained above are denoted by the same reference numerals and signs and explanation of the portions is omitted.

Figure 12:
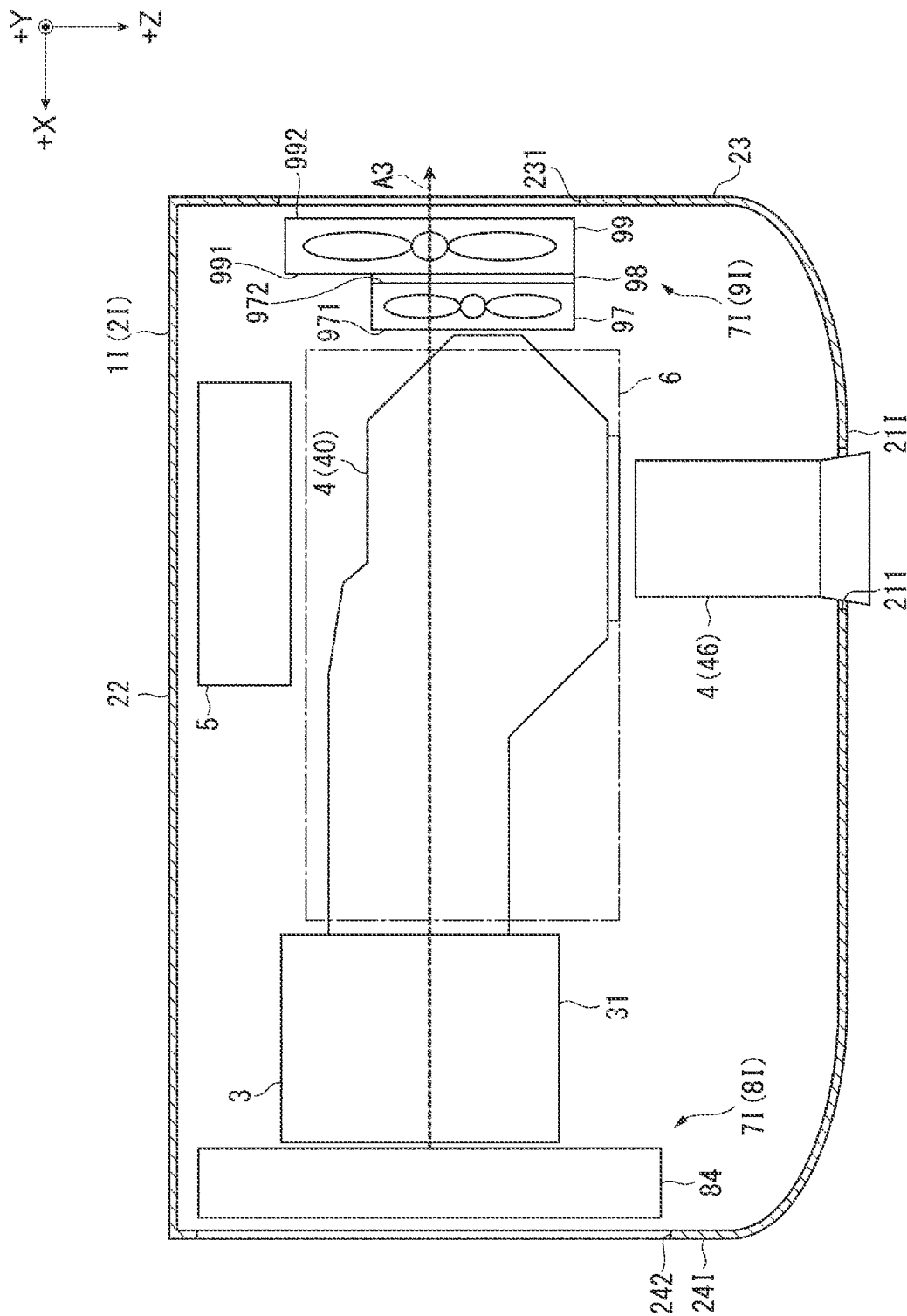
FIG. 12 is a schematic diagram showing the configuration of a projector according to a third embodiment.

FIG. 12 is a plan view showing an internal configuration of a projector 1I according to this embodiment. Illustration of a plurality of fans configuring a supply device 8I is omitted.

As shown in FIG. 12, the projector 1I according to this embodiment includes the same components and functions as the components and the functions of the projector 1A according to the first embodiment except that the projector 1I includes an exterior housing 2I and a cooling device 7I instead of the exterior housing 2 and the cooling device 7A.
Configuration of the Exterior Housing The exterior housing 2I includes the same components and functions as the components and the functions of the exterior housing 2 except that the exterior housing 2I includes a front surface 21I and a left side surface 24I instead of the front surface 21 and the left side surface 24.

The exterior housing 2I is equivalent to a housing and configures the exterior of the projector 1I. The exterior housing 2I houses the light source device 3, the image projection device 4, the power supply device 5, the control device 6, and the cooling device 7I.

The front surface 21I is equivalent to a first surface and is a surface in a projecting direction of image light in the exterior housing 2I.

The front surface 21I includes the first opening section 211 from a position substantially in the center in the +X direction to a position in the −X direction. The projection optical device 46 is exposed from the first opening section 211. That is, the front surface 21I does not include a second opening section unlike the front surface 21 of the exterior housing 2 according to the first embodiment.

The left side surface 24I is disposed in the +X direction in the exterior housing 2I. The left side surface 24I includes an opening section 242 opened in the +Z direction.

In the opening section 242, a cooling gas circulates in a direction of a dotted line arrow A3 shown in FIG. 12 by the cooling device 7I explained below. The opening section 242 is formed wide in the +Z direction to correspond to a discharge device 9I explained below unlike the opening section 241 of the exterior housing 2 according to the first embodiment. That is, the opening section 242 functions as an intake port for circulating air, which is the cooling gas, into the exterior housing 2I.
Configuration of the Cooling Device The cooling device 7I cools a cooling target housed on the inside of the exterior housing 2I. The cooling device 7I includes the supply device 8I and the discharge device 9I.
Configuration of the Supply Device The supply device 8I is provided to correspond to the opening section 242 in the exterior housing 2I. The supply device 8I introduces gas on the outside of the exterior housing 2I into the inside of the exterior housing 2I as the cooling gas via the opening section 242 and supplies the introduced cooling gas to the cooling target. The cooling target of the supply device 8I is at least one device of the light source device 3, the image projection device 4, the power supply device 5, and the control device 6. The gas supplied by the supply device 8I circulates to the discharge device 9I explained below along the arrow A3. In this embodiment, the cooling target is the light source device 3, the image projection device 4, and the control device 6. The supply device 8I includes a filter unit 84 and a not-shown plurality of fans.

The filter unit 84 is provided to correspond to the opening section 242. The filter unit 84 removes dust included in the gas introduced into the inside of the exterior housing 2I from the outside of the exterior housing 2I via the opening section 242.
Configuration of the Discharge Device The discharge device 9I sucks the cooling gas having circulated in the exterior housing 2I and cooled the cooling target and discharges the cooling gas to the outside of the exterior housing 2I. In this embodiment, the discharge device 9I sucks the cooling gas to which heat of the image projection device 4, which is the cooling target, is transmitted and discharges the sucked cooling gas to the outside of the exterior housing 2I to thereby cool the image projection device 4. The discharge device 9I includes a first discharge fan 97, a duct 98, and a second discharge fan 99.
Configuration of the First Discharge Fan The first discharge fan 97 is an axial fan that sucks the gas from the image projection device 4 and discharges the gas. Specifically, the first discharge fan 97 sucks the cooling gas to which heat of the image forming device 40 is transmitted in the image projection device 4 and discharges the cooling gas to the duct 98. The gas discharged to the duct 98 circulates to the second discharge fan 99. In this embodiment, all of the cooling gas sucked by the first discharge fan 97 and discharged from the first discharge fan 97 circulates to the second discharge fan 99 via the duct 98.

A surface opposed to the image projection device 4 in the first discharge fan 97 is an intake surface 971. A surface opposed to the second discharge fan 99 in the first discharge fan 97 is an exhaust surface 972 that discharges the sucked cooling gas.

Configuration of the Duct

The duct 98 connects the first discharge fan 97 and the second discharge fan 99 and circulates all of the cooling gas discharged by the first discharge fan 97 to the second discharge fan 99. The duct 98 extends in the −X direction from the first discharge fan 97 toward the second discharge fan 99. Specifically, a part in the +Z direction in the duct 98 extends along a discharging direction of the first discharge fan 97. A part in the −Z direction in the duct 98 is bent toward the second discharge fan 99. The dimension of the first discharge fan 97 viewed from a circulating direction of the cooling gas (the −X direction) is smaller than the dimension of the second discharge fan 99 viewed from a circulating direction of the cooling gas to the second discharge fan 99 (the −X direction).

Configuration of the Second Discharge Fan

The second discharge fan 99 is an axial fan that discharges the gas discharged from the discharge fan 97 into the duct 98 to the outside of the exterior housing 2I. Specifically, when the second discharge fan 99 is driven, the second discharge fan 99 discharges the gas blown out from the first discharge fan 97 via the duct 98 and the gas in the exterior housing 2I sucked from an intake surface 991 of the second discharge fan 99 to the outside of the exterior housing 2I. A surface on the opposite side of the intake surface 991 in the second discharge fan 99 is an exhaust surface 992 that discharges the sucked gas. The dimension of the intake surface 991 and the dimension of the exhaust surface 992 are substantially the same.

Differences Between the Specifications of the First Discharge Fan and the Specifications of the Second Discharge Fan An exhaust amount of the gas per unit time of the second discharge fan 99 is larger than an exhaust amount of the gas per unit time of the first discharge fan 97. Therefore, the second discharge fan 99 can suck all of the gas discharged from the first discharge fan 97 and discharge the gas to the outside of the exterior housing 2I via the opening section 231.

The dimension of the second discharge fan 99 viewed from the circulating direction of the gas to the second discharge fan 99 (the −X direction) is larger than the dimension of the first discharge fan 97 viewed from a circulating direction of the cooling gas to the first discharge fan 97 (the −X direction). That is, the area of the intake surface 991 of the second discharge fan 99 is larger than the area of the intake surface 971 of the first discharge fan 97. Therefore, a discharge amount of the cooling gas per unit time of the second discharge fan 99 can be set larger than a discharge amount of the cooling gas per unit time of the first discharge fan 97. Consequently, the number of revolutions per unit time of the second discharge fan 99 can be set smaller than the number of revolutions per unit time of the first discharge fan 97. Besides, noise such as wind noise leaking to the outside of the projector 1I can be reduced. By using the two discharge fans 97 and 99, the number of revolutions per unit time of the discharge fans 97 and 99 can be set lower than, when one discharge fan is used, the number of revolutions per unit time of the one discharge fan. The number of revolutions per unit time of the second discharge fan 99 can be set smaller than the number of revolutions per unit time of the first discharge fan 97. Consequently, noise leaking to the outside of the exterior housing 2 can be reduced.

When viewed from the circulating direction of the gas to the second discharge fan 99 (the −X direction), the entire first discharge fan 97 is covered by the second discharge fan 99. Therefore, it is possible to improve discharge efficiency of the cooling gas having cooled the image projection device 4, which is the cooling target. Besides, it is possible to suppress an increase in the size of the projector 1I while reducing noise of the projector 1I.

Effects of the Third Embodiment

The projector according to this embodiment explained above achieves the same effects as the effects of the projector 1A according to the first embodiment and achieves effects described below.

With such a configuration, the gas can be discharged from the right side surface 23 of the projector 1I. For example, the gas discharged in the case of a configuration in which a projection surface such as a screen is disposed near the front surface 21I side is not discharged to the projection surface side.

Modification of the Third Embodiment

In the cooling device 7I, the cooling gas is discharged to the outside of the exterior housing 2I by the discharge device 9I. However, not only this, but, as in the cooling device 7E according to the second embodiment, the discharge device 9I may be configured to introduce air, which is the cooling gas, into the exterior housing 2I. In this case, for example, an opening section may be provided on the rear surface 22 to be adopted as a discharge port for discharging the gas in the exterior housing 2I to the outside of the exterior housing 2I.

Modifications of the Embodiments

The present disclosure is not limited to the embodiments. Modifications, improvements, and the like in a range in which the object of the present disclosure can be achieved are included in the present disclosure.

In the embodiments, the light source devices, the image projection devices, the power supply devices, the control devices, and the cooling devices in the exterior housings 2 and 2I of the projectors 1A, 1E, and 1I are arranged in layouts shown in FIGS. 1, 7, and 12. However, not only this, but the light source devices, the image projection devices, the power supply devices, the control devices, and the cooling devices in the exterior housings 2 and 2I are not limited to those explained above.

In the first embodiment and the third embodiment, when viewed from the discharging direction of the gas by the second discharge fans 93A, 93C, 93D, and 99, the entire one of the first discharge fans 91A, 91B, 91D, and 97 and the second discharge fans 93A, 93C, 93D, and 99 is covered by the other fan. However, not only this, but, when viewed from the discharging direction of the gas, entire one fan of the first discharge fans 91A, 91B, 91D, and 97 and the second discharge fans 93A, 93C, 93D, and 99 may not be covered by the other fan. That is, all of the gas discharged by the first discharge fan only has to be discharged to the second discharge fan via the duct.

In the first embodiment and the third modification of the second embodiment, the ducts 92A and 95D include the circulation ports 924, 925, 954, and 955 for circulating the gas on the inside of the exterior housing 2 into the ducts 92A and 95D. However, not only this, but the ducts 92A and 95D may not include the circulation ports 924, 925, 954, and 955 for circulating the gas into the ducts 92A and 95D. For example, the gas in the exterior housing 2 may be discharged to the outside of the exterior housing 2 without circulating in a duct.

In the first embodiment and the third embodiment, the discharge amounts of the gas per unit time of the second discharge fans 93A, 93C, 93D, and 99 are larger than the discharge amounts of the gas per unit time of the first discharge fans 91A, 91B, 91D, and 97. However, not only this, but the discharge amount of the gas per unit time of the second discharge fan may be substantially the same as the discharge amount of the gas per unit time of the first discharge fan or may be smaller than the discharge amount of the gas per unit time of the first discharge fan.

In the first embodiment, the first modification of the first embodiment, the third modification of the first embodiment, and the third embodiment, the dimensions of the second discharge fans 93A, 93D, and 99 viewed along the circulating direction of the gas to the second discharge fans 93A, 93D, and 99 are equal to or larger than the dimensions of the first discharge fans 91A, 91B, 91D, and 97 viewed along the circulating direction of the gas to the first discharge fans 91A, 91B, 91D, and 97. However, not only this, but the dimensions of the second discharge fans 93A, 93D, and 99 viewed along the circulating direction of the gas to the second discharge fans 93A, 93D, and 99 may not be equal to or larger than the dimensions of the first discharge fans 91A, 91B, 91D, and 97 viewed along the circulating direction of the gas to the first discharge fans 91A, 91B, 91D, and 97.

In the embodiments, the exterior housing 2 includes the front surface 21 including the first opening section 211 from which a part of the projection optical device 46 is exposed. The front surface 21 includes the second opening section 212 through which the gas discharged from the second discharge fans 93A, 93C, and 99 circulates. The second opening section 212 is disposed in a direction away from the first opening section 211 on the front surface 21. However, not only this, but a surface on which an opening section through which the gas exhausted from the second discharge fans 93A, 93C, and 99 in the exterior housing 2 is circulated is provided may not be the front surface 21. For example, the opening section may be provided on the rear surface 22 or may be provided on a not-shown top surface or bottom surface.

In the first embodiment, the image projection device 4 includes the projection optical device 46 that projects image light. The exterior housing 2 includes the front surface 21 disposed in the projecting direction of the image light by the image projection device 4. The front surface 21 includes the first opening section 211 from which a part of the projection optical device 46 is exposed and the second opening section 212 through which the gas discharged by the second discharge fans 93A, 93C, and 93D circulates. The second discharge fans 93A, 93C, and 93D discharge the cooling gas in the direction away from the first opening section 211. However, not only this, but the image projection device 4 may not include the projection optical device 46. The front surface 21 in the exterior housing 2 may not include the first opening section 211 and the second opening section 212. Further, the second discharge fans 93A, 93C, and 93D may not discharge the cooling gas in the direction away from the first opening section 211.

In the first embodiment and the third embodiment, all of the cooling gas discharged from the first discharge fans 91A, 91B, 91D, and 97 circulates to the second discharge fans 93A, 93C, 93D, and 99. However, not only this, but a part of the cooling gas discharged from the first discharge fans 91A, 91B, 91D, and 97 may not circulate to the second discharge fans 93A, 93C, 93D, and 99.

In the second embodiment, one fan of the first supply fans 94A, 94B, 94C, and 94D and the second supply fans 96A and 96C supplies a part of the sucked gas to the inside of the exterior housing 2. When viewed from the opposite direction of the supplying direction of the gas by the second supply fans 96A and 96C, entire one fan of the first supply fans 94A, 94B, 94C, and 94D and the second supply fans 96A and 96C is covered by the other fan. However, not only this, but one fan of the first supply fans 94A, 94B, 94C, and 94D and the second supply fans 96A and 96C may supply a part of the sucked gas to the inside of the exterior housing 2. When viewed from the opposite direction of the supply direction of the gas by the second supply fans 96A and 96C, entire one fan of the first supply fans 94A, 94B, 94C, and 94D and the second supply fans 96A and 96C may not be covered by the other fan.

In the third modification of the second embodiment, the duct 95D includes the partitioning section 956 that divides the gas supplied by the second supply fan 96D into the gas supplied to the first supply fan 94D and the gas supplied to the inside of the exterior housing 2. However, not only this, but the partitioning section 956 may not be provided in the duct 95D.

In the first modification of the second embodiment and the third modification of the second embodiment, the dimensions of the first supply fans 94B and 94D viewed from the circulating direction of the gas to the first supply fans 94B and 94D and the dimensions of the second supply fans 96A and 96C viewed from the circulating direction of the gas to the second supply fans 96A and 96C are substantially the same. However, not only this, but the dimensions of the first supply fans 94B and 94D viewed from the circulating direction of the gas to the first supply fans 94B and 94D and the dimensions of the second supply fans 96A and 96C viewed from the circulating direction of the gas to the second supply fans 96A and 96C may not be substantially the same.

In the second embodiment and the second modification of the second embodiment, the dimensions of the first supply fans 94A and 94C viewed from the circulating direction of the gas to the first supply fans 94A and 94C and the dimensions of the second supply fans 96A and 96C viewed from the circulating direction of the gas to the second supply fans 96A and 96C are different. However, not only this, but the dimensions of the first supply fans 94A and 94C viewed from the circulating direction of the gas to the first supply fan 94A and 94C and the dimensions of the second supply fans 96A and 96C viewed from the circulating direction of the gas to the second supply fans 96A and 96C may be substantially the same.

In the second embodiment, the second modification of the second embodiment, and the third modification of the second embodiment, of the first supply fans 94A, 94C, and 94D and the second supply fans 96A and 96C, the fan having a small dimension when viewed from the circulating direction of the gas overlaps the cooling target when viewed from the circulating direction of the gas. However, not only this, but, of the first supply fans 94A, 94C, and 94D and the second supply fans 96A and 96C, the fan having a small dimension when viewed from the circulating direction of the gas may not overlap the cooling target when viewed from the circulating direction of the gas.

In the second modification and the third modification of the first embodiment, in the discharging section 922 of the ducts 92C and 92D, an outer side region with respect to the exhaust surface 932 of the second discharge fans 93C and 93D may be opened or may be closed.

In the second modification and the third modification of the second embodiment, the projecting sections 953 of the ducts 95C and 95D may include opening sections for introducing the gas on the outside of the ducts 95C and 95D into the ducts 95C and 95D. For example, the ducts 95C and 95D may include opening sections for introducing the gas on the outside of the exterior housing 2 into the inside of the ducts 95C and 95D.

In the embodiments, the cooling target is one device of the light source device 3 and the image projection device 4. However, not only this, but the cooling target may be at least one of the light source device 3, the image projection device 4, the power supply device 5, and the control device 6.

In the embodiments, the projectors 1A, 1E, and 1I each include the three light modulation devices 443B, 443G, and 443R. However, not only this, but the present disclosure is applicable to a projector including two or less or four or more light modulation devices as well.

In the embodiments, the light modulation device 443 is the transmission-type liquid crystal panel, the light incident surface and the light emission surface of which are different. However, not only this, but, as the light modulation device, a reflection-type liquid crystal panel, a light incident surface and a light emission surface of which are the same, may be used. A light modulation device other than liquid crystal such as a light modulation device that makes use of a device including a micromirror, for example, a DMD (Digital Micromirror Device) may be used if the light modulation device is capable of modulating an incident light beam and forming an image corresponding to image information.

Overview of the Present Disclosure

An overview of the present disclosure is noted below.

A projector according to a first aspect of the present disclosure includes: a light source device; an image projection device configured to modulate light emitted from the light source device to generate image light and project the image light; a power supply device configured to supply electric power to the light source device and the image projection device; a housing configured to house the light source device, the image projection device, and the power supply device; a first discharge fan configured to set at least one device of the light source derive, the image projection device, and the power supply device as a cooling target and suck gas from the cooling target and discharge the gas; a second discharge fan configured to discharge the gas discharged by the first discharge fan and the gas in the housing to an outside of the housing; and a duct for circulating the gas discharged by the first discharge fan to the second discharge fan.

With such a configuration, the gas can be circulated to the cooling target by the first discharge fan. Besides, it is possible to suck the gas having cooled the cooling target and discharge the gas to the duct. The duct can rectify the gas having circulated from the first discharge fan and circulate the gas in the duct. Therefore, since the gas circulating in the duct is easily sucked by the second discharge fan and discharged to the outside of the housing, it is possible to quickly discharge a cooling gas having cooled the cooling target and having heat to the outside of the housing. Consequently, circulation efficiency of the gas is improved. Eventually, it is possible to improve cooling efficiency of the cooling target.

In the first aspect, when viewed from a discharging direction of the gas by the second discharge fan, entire one fan of the first discharge fan and the second discharge fan may be covered by another fan.

When viewed from the discharging direction of the gas by the second discharge fan, entire one fan of the first discharge fan and the second discharge fan is covered by the other fan. Consequently, compared with when one fan of the first discharge fan and the second discharge fan is disposed to project to the outer side of the other fan, the first discharge fan and the second discharge fan can be compactly disposed.

Therefore, it is possible to suppress the projector from increasing in size while improving the cooling efficiency of the cooling target.

In the first aspect, the duct may include a circulation port opened to an inside of the housing to circulate the gas on the inside of the housing into the duct.

With such a configuration, not only the gas discharged from the first discharge fan but also the gas having circulated in the housing can be discharged by the second discharge fan. Therefore, it is unnecessary to separately provide a fan that discharges the gas in the housing. Therefore, it is possible to suppress constituent components of the projector from increasing. Besides, it is possible to suppress an increase in the size of the projector.

In the first aspect, a discharge amount of the gas per unit time of the second discharge fan may be larger than a discharge amount of the gas per unit time of the first discharge fan.

With such a configuration, all of the gas discharged from the first discharge fan can be quickly discharged to the outside of the housing by the second discharge fan. Therefore, it is possible to suppress the gas having cooled the cooling target and having increased temperature from stagnating in the projector. Therefore, it is possible to improve the cooling efficiency of the cooling target.

In the first aspect, a dimension of the second discharge fan viewed along a circulating direction of the gas to the second discharge fan may be equal to or larger than a dimension of the first discharge fan viewed along a circulating direction of the gas to the first discharge fan.

When the dimension of the second discharge fan is larger than the dimension of the first discharge fan, a discharge amount of the gas per unit time of the second discharge fan can be easily set larger than a discharge amount of the gas per unit time of the first discharge fan.

When the dimension of the second discharge fan is larger than the dimension of the first discharge fan and the discharge amount of the gas per unit time of the second discharge fan is the same as the discharge amount of the gas per unit time of the first discharge fan, the number of revolutions per unit time of the second discharge fan can be set smaller than the number of revolutions per unit time of the first discharge fan. By using the two discharge fans, it is possible to reduce the numbers of revolutions per unit time of the discharge fans compared with, when one discharge fan is used, the number of revolutions per unit time of the discharge fan. Consequently, it is possible to reduce noise leaking to the outside of the housing. Further, since the dimension of the second discharge fan is larger than the dimension of the first discharge fan, when viewed from the discharging direction of the gas by the second discharge fan, the entire first discharge fan can be easily covered by the second discharge fan.

On the other hand, when the dimension of the second discharge fan is the same as the dimension of the first discharge fan, fans of the same standard can be adopted as the first discharge fan and the second discharge fan. Therefore, it is possible to suppress an increase in manufacturing cost of the projector.

In the first aspect, the image projection device may include a projection optical device configured to project the image light, the housing may include a first surface disposed in a projecting direction of the image light by the image projection device, the first surface may include: a first opening section from which a part of the projection optical device is exposed; and a second opening section through which the gas discharged by the second discharge fan circulates, and the second discharge fan may discharge a cooling gas in a direction away from the first opening section.

With such a configuration, it is possible to suppress the gas having high temperature discharged to the outside of the housing via the second opening section by the second discharge fan from circulating to the first opening section. Therefore, it is possible to suppress the gas having high temperature from circulating to a projection range of the image light by the projection optical device. Therefore, it is possible to suppress deterioration such as shimmering from occurring in a projected image.

In the first aspect, all of a cooling gas discharged from the first discharge fan may circulate to the second discharge fan.

With such a configuration, the gas having cooled the cooling target can be easily discharged to the outside of the housing by the second discharge fan. Therefore, it is possible to suppress the gas having heat from stagnating in the housing. It is possible to improve the cooling efficiency of the cooling target.

A projector according to a second aspect of the present disclosure includes: a light source device; an image projection device configured to modulate light emitted from the light source device to generate image light and project the image light; a power supply device configured to supply electric power to the light source device and the image projection device; a housing configured to house the light source device, the image projection device, and the power supply device; a first supply fan configured to set at least one device of the light source derive, the image projection device, and the power supply device as a cooling target and supply gas to the cooling target; a second supply fan configured to supply the gas sucked from an outside of the housing to the first supply fan; and a duct for circulating the gas supplied by the second supply fan to the first supply fan. The first supply fan supplies the gas supplied by the second supply fan to the cooling target to cool the cooling target. One fan of the first supply fan and the second supply fan supplies a part of the sucked gas to an inside of the housing.

With such a configuration, the gas sucked from the outside of the housing by the second supply fan is supplied to the first supply fan via the duct and supplied to the cooling target by the first supply fan. Therefore, compared with a configuration in which a duct is not provided, it is possible to rectify the gas supplied by the second supply fan and circulate the gas in the duct. The gas blown out from the second supply fan can be quickly supplied to the cooling target by the first supply fan. Consequently, it is possible to improve the cooling efficiency of the cooling target.

When viewed from an opposite direction of a supplying direction of the gas by the second supply fan, entire one fan of the first supply fan and the second supply fan may be covered by another fan.

With such a configuration, when viewed from the opposite direction of the supplying direction of the gas by the second supply fan, entire one fan of the first supply fan and the second supply fan is covered by the other fan. Consequently, compared with when one fan of the first supply fan and the second supply fan is disposed to project to the outer side of the other fan, the first supply fan and the second supply fan can be compactly disposed.

Therefore, it is possible to suppress the projector from increasing in size while improving the cooling efficiency of the cooling target.

In the second aspect, the duct may include a partitioning section configured to divide the gas supplied by the second supply fan into the gas supplied to the first supply fan and the gas supplied to the inside of the housing.

With such a configuration, the gas sucked from the outside of the housing by the second supply fan can be supplied to the first supply fan and the inside of the housing. Therefore, compared with when a fan that introduces the gas on the outside of the housing into the inside of the housing is separately provided, it is possible to suppress an increase in the number of components of the projector.

In the second aspect, a dimension of the first supply fan viewed from a circulating direction of the gas to the first supply fan and a dimension of the second supply fan viewed from a circulating direction of the gas to the second supply fan may be substantially same.

With such a configuration, fans of the same standard can be adopted as the first supply fan and the second supply fan. Therefore, it is possible to suppress an increase in manufacturing cost of the projector.

In the second aspect, a dimension of the first supply fan viewed from a circulating direction of the gas to the first supply fan and a dimension of the second supply fan viewed from a circulating direction of the gas to the second supply fan may be different.

With such a configuration, after the specifications of the first supply fan are determined according to the cooling target, in selecting the second supply fan having performance equal to or higher than performance of the first supply fan, it is possible to improve selection flexibility for the second supply fan.

In the second aspect, of the first supply fan and the second supply fan, a fan having a small dimension when viewed from a circulating direction of the gas may overlap the cooling target when viewed from the circulating direction of the gas.

With such a configuration, it is possible to efficiently circulate the gas to the cooling target. Therefore, it is possible to improve the cooling efficiency of the cooling target.

In the first aspect and the second aspect, the cooling target may be one device of the light source device and the image projection device.

If cooling of the light source device is not appropriately performed, the luminance of a projected image decreases. Besides, the light source device is easily deteriorated and the life of the light source device decreases. In contrast, when the cooling target is the light source device, since the cooling efficiency of the light source device can be improved, it is possible to suppress the luminance of the projected image from decreasing. Besides, it is possible to achieve extension of the life of the light source device and the life of the projector.

If cooling of the image projection device is not appropriately performed, optical components configuring the image projection device are easily deteriorated and the life of the image projection device decreases. In contrast, when the cooling target is the image projection device, since the cooling efficiency of the image projection device can be improved, it is possible to achieve extension of the life of the image projection device and the life of the projector.

What is claimed is:

1. A projector comprising:
a light source device;
an image projection device configured to modulate light emitted from the light source device to generate image light and project the image light;
a power supply device configured to supply electric power to the light source device and the image projection device;
a housing configured to house the light source device, the image projection device, and the power supply device;
a first discharge fan configured to set at least one device of the light source device, the image projection device, and the power supply device as a cooling target and suck gas from the cooling target and discharge the gas;
a second discharge fan configured to discharge the gas discharged by the first discharge fan to an outside of the housing and discharge a gas from inside the housing to the outside of the housing; and
a duct connecting the first discharge fan to the second discharge fan for circulating the gas discharged by the first discharge fan to the second discharge fan, a surface of the duct comprising a circulation port opened to an interior of the housing to circulate the gas from the interior of the housing to the duct.

2. The projector according to claim 1, wherein, when viewed from a discharging direction of the gas by the second discharge fan, entire one fan of the first discharge fan and the second discharge fan is covered by another fan.

3. The projector according to claim 1, wherein a discharge amount of the gas per unit time of the second discharge fan is larger than a discharge amount of the gas per unit time of the first discharge fan.

4. The projector according to claim 3, wherein a number of revolutions per unit time of the second discharge fan is smaller than a number of revolutions per unit time of the first discharge fan.

5. The projector according to claim 1, wherein a dimension of the second discharge fan viewed along a circulating direction of the gas to the second discharge fan is equal to or larger than a dimension of the first discharge fan viewed along a circulating direction of the gas to the first discharge fan.

6. The projector according to claim 1, wherein
the image projection device includes a projection optical device configured to project the image light,
the housing includes a first surface disposed in a projecting direction of the image light by the image projection device,
the first surface includes:
a first opening section from which a part of the projection optical device is exposed; and
a second opening section through which the gas discharged by the second discharge fan circulates, and
the second discharge fan discharges a cooling gas in a direction away from the first opening section.

7. The projector according to claim 1, wherein all of a cooling gas discharged from the first discharge fan circulates to the second discharge fan.

8. A projector comprising:
a light source device;
an image projection device configured to modulate light emitted from the light source device to generate image light and project the image light;
a power supply device configured to supply electric power to the light source device and the image projection device;
a housing configured to house the light source device, the image projection device, and the power supply device;
a first supply fan configured to set at least one device of the light source device, the image projection device, and the power supply device as a cooling target and supply gas to the cooling target;
a second supply fan configured to supply the gas sucked from an outside of the housing to the first supply fan; and
a duct connecting the first supply fan to the second supply fan for circulating the gas supplied by the second supply fan to the first supply fan, a surface of the duct comprising a circulation port opened to an interior of the housing to circulate the gas from the duct to the interior of the housing, wherein
the first supply fan supplies the gas supplied by the second supply fan to the cooling target to cool the cooling target, and
one fan of the first supply fan and the second supply fan supplies a part of the sucked gas to an inside of the housing.

9. The projector according to claim 8, wherein, when viewed from an opposite direction of a supplying direction of the gas by the second supply fan, entire one fan of the first supply fan and the second supply fan is covered by another fan.

10. The projector according to claim 8, wherein the duct includes a partitioning section configured to divide the gas supplied by the second supply fan into the gas supplied to the first supply fan and the gas supplied to the inside of the housing.

11. The projector according to claim 8, wherein a dimension of the first supply fan viewed from a circulating direction of the gas to the first supply fan and a dimension of the second supply fan viewed from a circulating direction of the gas to the second supply fan are substantially same.

12. The projector according to claim 8, wherein a dimension of the first supply fan viewed from a circulating direction of the gas to the first supply fan and a dimension of the second supply fan viewed from a circulating direction of the gas to the second supply fan are different.

13. The projector according to claim 12, wherein, of the first supply fan and the second supply fan, a fan having a small dimension when viewed from a circulating direction of the gas overlaps the cooling target when viewed from the circulating direction of the gas.

14. The projector according to claim 12, wherein
the dimension of the second supply fan viewed from the circulating direction of the gas to the second supply fan is larger than the dimension of the first supply fan viewed from the circulating direction of the gas to the first supply fan, and
a supply amount of the gas per unit time of the second supply fan is larger than a supply amount of the gas per unit time of the first supply fan.

15. The projector according to claim 14, wherein a number of revolutions per unit time of the second supply fan is smaller than a number of revolutions per unit time of the first supply fan.

16. The projector according to claim 1, wherein the cooling target is one device of the light source device and the image projection device.

17. The projector according to claim 1, wherein, when viewed from a discharging direction of the gas by the second discharge fan, an exhaust surface of the first discharge fan is whole covered within an intake surface of the second discharge fan.

18. The projector according to claim 1, wherein, when viewed from a discharging direction of the gas by the second discharge fan, an intake surface of the second discharge fan is whole covered within an exhaust surface of the first discharge fan.

19. The projector according to claim 8, wherein, when viewed from an opposite direction of a supply direction of the gas by the second supply fan, an intake surface of the first supply fan is whole covered within an exhaust surface of the second supply fan.

20. The projector according to claim 8, wherein, when viewed from an opposite direction of a supply direction of the gas by the second supply fan, an exhaust surface of the second supply fan is whole covered within an intake surface of the first supply fan.

\* \* \* \* \*